United States Patent
Schoenblum

(10) Patent No.: US 9,832,351 B1
(45) Date of Patent: Nov. 28, 2017

(54) REDUCED COMPLEXITY VIDEO FILTERING USING STEPPED OVERLAPPED TRANSFORMS

(71) Applicant: Cisco Technology, Inc., San Jose, CA (US)

(72) Inventor: Joel Warren Schoenblum, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/260,467

(22) Filed: Sep. 9, 2016

(51) Int. Cl.
*H04N 5/00* (2011.01)
*H04N 5/21* (2006.01)
*G06T 5/00* (2006.01)

(52) U.S. Cl.
CPC .............. *H04N 5/21* (2013.01); *G06T 5/002* (2013.01)

(58) Field of Classification Search
CPC .................................. H04N 5/21; G06T 5/002
USPC ....................................................... 348/607
See application file for complete search history.

(56) References Cited

U.S. PATENT DOCUMENTS

| | | | |
|---|---|---|---|
| 4,442,454 A | 4/1984 | Powell | |
| 4,698,672 A | 10/1987 | Chen et al. | |
| 5,699,336 A | 12/1997 | Maeda et al. | |
| 5,764,805 A | 6/1998 | Martucci et al. | |
| 6,091,460 A | 7/2000 | Hatano et al. | |
| 6,442,203 B1 | 8/2002 | Demos | |
| 6,735,342 B2 | 5/2004 | Felts et al. | |
| 6,754,234 B1 | 6/2004 | Wiesner et al. | |
| 6,801,573 B2 | 10/2004 | Zheng | |
| 7,206,459 B2 | 4/2007 | Berkner et al. | |
| 7,554,611 B2 | 6/2009 | Zhou et al. | |
| 7,916,951 B2 | 3/2011 | Landwehr et al. | |
| 7,965,425 B2 | 6/2011 | Silverbrook | |
| 8,130,828 B2 | 3/2012 | Hsu et al. | |
| 8,200,063 B2 * | 6/2012 | Chen ................. | G06F 17/30787 386/239 |

(Continued)

FOREIGN PATENT DOCUMENTS

| | | |
|---|---|---|
| CN | 1154044 A | 7/1997 |
| EP | 0762738 A2 | 3/1997 |
| WO | 9108547 | 6/1991 |

OTHER PUBLICATIONS

European Summons to Attend Oral Proceedings dated Dec. 1, 2016 cited in Application No. 10 730 897.5, 8 pgs.

(Continued)

*Primary Examiner* — Michael Lee
(74) *Attorney, Agent, or Firm* — Merchant & Gould P.C.

(57) ABSTRACT

Pseudorandom overlapped block processing may be provided. First, a first temporal sequence of video frames corrupted with noise may be received. Next, matched frames may be producing by frame matching video frames of the first temporal sequence according to a first stage of processing. Then the matched frames may be denoised according to a second stage of processing. The second stage of processing may commence responsive to completion of the first stage of processing for all the video frames of the first temporal sequence. The second stage of processing may comprise overlapped block processing. The overlapped block processing may comprise pseudorandom overlapped block processing having no successive pixels both horizontally and vertically that are one-sized in transforms.

20 Claims, 28 Drawing Sheets

(56) References Cited

U.S. PATENT DOCUMENTS

| | | | |
|---|---|---|---|
| 8,275,047 B2 | 9/2012 | Denolf | |
| 8,285,068 B2 | 10/2012 | Schoenblum | |
| 8,358,380 B2* | 1/2013 | Schoenblum | H04N 5/21 348/607 |
| 8,472,725 B2 | 6/2013 | Schoenblum | |
| 8,520,731 B2 | 8/2013 | Schoenblum | |
| 8,571,117 B2* | 10/2013 | Schoenblum | G06T 5/50 375/240.29 |
| 8,615,044 B2 | 12/2013 | Schoenblum | |
| 8,619,881 B2 | 12/2013 | Schoenblum | |
| 8,638,395 B2 | 1/2014 | Schoenblum et al. | |
| 8,781,244 B2 | 7/2014 | Schoenblum | |
| 9,237,259 B2 | 1/2016 | Schoenblum et al. | |
| 9,342,204 B2 | 5/2016 | Schoenblum | |
| 9,628,674 B2 | 4/2017 | Schoenblum | |
| 9,635,308 B2 | 4/2017 | Schoenblum | |
| 2002/0196857 A1 | 12/2002 | Kono et al. | |
| 2003/0081685 A1 | 5/2003 | Montgomery | |
| 2003/0086623 A1 | 5/2003 | Berkner et al. | |
| 2003/0128761 A1 | 7/2003 | Zhou | |
| 2005/0078872 A1 | 4/2005 | Samadani et al. | |
| 2005/0094893 A1 | 5/2005 | Samadani | |
| 2005/0100235 A1 | 5/2005 | Kong et al. | |
| 2005/0100236 A1 | 5/2005 | Kong et al. | |
| 2005/0100236 A1 | 5/2005 | Kong et al. | |
| 2005/0100237 A1 | 5/2005 | Kong et al. | |
| 2005/0100241 A1 | 5/2005 | Kong et al. | |
| 2005/0262276 A1 | 11/2005 | Singh et al. | |
| 2006/0002472 A1 | 1/2006 | Mehta et al. | |
| 2006/0039624 A1 | 2/2006 | Kong et al. | |
| 2006/0056724 A1 | 3/2006 | Le Dinh et al. | |
| 2006/0133682 A1 | 6/2006 | Tu et al. | |
| 2006/0198439 A1 | 9/2006 | Zhu | |
| 2006/0204046 A1 | 9/2006 | Xia et al. | |
| 2006/0245497 A1 | 11/2006 | Tourapis et al. | |
| 2007/0041448 A1 | 2/2007 | Miller et al. | |
| 2007/0071095 A1 | 3/2007 | Lim | |
| 2007/0092007 A1 | 4/2007 | Ho | |
| 2007/0140352 A1 | 6/2007 | Bhaskaran et al. | |
| 2007/0237238 A1 | 10/2007 | Xia et al. | |
| 2008/0055477 A1 | 3/2008 | Wu et al. | |
| 2008/0123740 A1 | 5/2008 | Ye | |
| 2008/0151101 A1 | 6/2008 | Tian et al. | |
| 2008/0211965 A1 | 9/2008 | Lippman | |
| 2008/0253457 A1 | 10/2008 | Moore | |
| 2008/0260033 A1 | 10/2008 | Austerlitz et al. | |
| 2008/0285650 A1 | 11/2008 | Chappalli | |
| 2009/0002553 A1 | 1/2009 | Living | |
| 2009/0016442 A1 | 1/2009 | Shankar et al. | |
| 2009/0067504 A1 | 3/2009 | Zheludkov et al. | |
| 2009/0083228 A1 | 3/2009 | Shatz et al. | |
| 2009/0097566 A1 | 4/2009 | Huang et al. | |
| 2009/0167952 A1 | 7/2009 | Kamimura | |
| 2009/0238535 A1 | 9/2009 | Robertson et al. | |
| 2009/0327386 A1 | 12/2009 | Schoenblum | |
| 2010/0020880 A1 | 1/2010 | Susnow et al. | |
| 2010/0027897 A1 | 2/2010 | Sole et al. | |
| 2010/0033633 A1 | 2/2010 | Dane et al. | |
| 2010/0091862 A1 | 4/2010 | Kuo et al. | |
| 2010/0265344 A1 | 10/2010 | Velarde et al. | |
| 2010/0309377 A1 | 12/2010 | Schoenblum et al. | |
| 2010/0309379 A1 | 12/2010 | Schoenblum et al. | |
| 2010/0309979 A1 | 12/2010 | Schoenblum | |
| 2010/0309989 A1 | 12/2010 | Schoenblum | |
| 2010/0309990 A1 | 12/2010 | Schoenblum | |
| 2010/0309991 A1 | 12/2010 | Schoenblum | |
| 2010/0316129 A1 | 12/2010 | Zhao et al. | |
| 2011/0298984 A1 | 12/2011 | Schoenblum | |
| 2011/0298986 A1 | 12/2011 | Schoenblum | |
| 2011/0299781 A1 | 12/2011 | Schoenblum | |
| 2012/0230423 A1 | 9/2012 | Esenlik et al. | |
| 2013/0028525 A1 | 1/2013 | Schoenblum | |
| 2013/0114690 A1* | 5/2013 | Chono | H04N 19/0009 375/240.03 |
| 2013/0290849 A1 | 10/2013 | Schoenblum | |
| 2014/0125869 A1 | 5/2014 | Schoenblum | |
| 2016/0119508 A1 | 4/2016 | Schoenblum et al. | |

OTHER PUBLICATIONS

U.S. Office Action dated May 21, 2013 cited in U.S. Appl. No. 12/791,941, 23 pgs.
U.S. Office Action dated Oct. 24, 2013 cited in U.S. Appl. No. 13/646,795, 22 pgs.
U.S. Final Office Action dated Dec. 2, 2013 cited in U.S. Appl. No. 12/791,941, 20 pgs.
U.S. Final Office Action dated Dec. 19, 2013 cited in U.S. Appl. No. 12/791,987, 17 pgs.
U.S. Office Action dated Jul. 3, 2014 cited in U.S. Appl. No. 12/791,987, 20 pgs.
U.S. Office Action dated Aug. 22, 2014 cited in U.S. Appl. No. 14/154,502, 19 pgs.
U.S. Office Action dated Jan. 15, 2015 cited in U.S. Appl. No. 12/791,941, 20 pgs.
U.S. Office Action dated Jan. 27, 2015 cited in U.S. Appl. No. 12/791,987, 22 pgs.
U.S. Office Action dated Apr. 20, 2015 cited in U.S. Appl. No. 14/154,502, 9 pgs.
U.S. Office Action dated Aug. 6, 2015 cited in U.S. Appl. No. 12/791,941, 25 pgs.
U.S. Office Action dated Sep. 24, 2015 cited in U.S. Appl. No. 123/926,703, 28 pgs.
U.S. Office Action dated Jan. 20, 2016 cited in U.S. Appl. No. 12/791,987, 29 pgs.
U.S. Office Action dated Jul. 12, 2016 cited in U.S. Appl. No. 12/791,941, 32 pgs.
U.S. Final Office Action dated Sep. 9, 2016 cited in U.S. Appl. No. 12/791,987, 40 pgs.
International Search Report dated Dec. 4, 2009 cited in Application No. PCT/US2009/048422, 17 pgs.
International Search Report and Written Opinion dated Aug. 24, 2010 cited in Application No. PCT/US2010/037189, 17 pgs.
European Office Action dated Nov. 15, 2011 cited in Appl. No. 09 770 924.01, 4 pgs.
Chinese First Office Action dated Aug. 1, 2012 cited in Appl. No. 200980124315.4, 14 pgs.
European Communication dated Mar. 14, 2013 cited in Application No. 10730897.5, 4 pgs.
Chinese First Office Action dated Jan. 30, 2014 cited in Application No. 201080024719.9, 16 pgs.
European Office Action dated Feb. 19, 2014 cited in Application No. 09 770 924.01, 6 pgs.
Extended European Search Report dated Feb. 27, 2014 cited in Application No. 13 189 789.4, 12 pgs.
Chinese Second Office Action dated Sep. 22, 2014 cited in Application No. 201080024719.9, 18 pgs.
European Office Action dated Feb. 6, 2015 cited in Application No. 10 730 897.5, 5 pgs.
European Office Action dated Jun. 30, 2016 cited in Application 09 770 924.01, 4 pgs.
European Office Action dated Jun. 30, 2016 cited in Application 13 189 789.4, 6 pgs.
U.S. Appl. No. 12/479,018, filed Jun. 5, 2009, entitled "Out of Loop Frame Matching in 3D-Based Video Denoising", Inventor: Joe Schoenblum.
U.S. Appl. No. 12/479,065, filed Jun. 5, 2009, entitled "Consolidating Prior Temporally-Matched Frames in 3D-Based Video Denoising", Inventor: Joe Schoenblum.
U.S. Appl. No. 14/154,502, filed Jan. 14, 2014, entitled "Summating Temporally-Matched Frames in 3D-3ased Video Denoising", Inventors: Joel W. Schoenblum et al.
U.S. Appl. No. 14/992,234, filed Jan. 11, 2016, entitled "Processing Prior Temporally-Matched Frames in 3D-Based Video Denoising", Inventor: Joel Schoenblum.

(56) References Cited

OTHER PUBLICATIONS

U.S. Appl. No. 12/479,104, filed Jun. 5, 2009, entitled "Efficient Spatial and Temporal Transform-Based Video Preprocessing", Inventor: Joe Schoenblum.
U.S. Appl. No. 12/479,147, filed Jun. 5, 2009, entitled "Estimation of Temporal Depth of 3D Overlapped Transforms in Video Denoising", Inventor: Joe Schoenblum.
U.S. Appl. No. 12/479,194, filed Jun. 5, 2009, entitled "Adaptive Thresholding of 3D Transform Coefficients for Video Denoising", Inventor: Joe Schoenblum.
U.S. Appl. No. 12/479,244, filed Jun. 5, 2009, entitled "Motion Estimation for Noisy Frames Based on Block Matching of Filtered Blocks", Inventor: Joe Schoenblum.
U.S. Appl. No. 12/146,369, filed Jun. 25, 2008, entitled "Combined Deblocking and Denoising Filter", Inventor: Joe Schoenblum.
U.S. Appl. No. 12/791,941, filed Jun. 2, 2010, entitled "Preprocessing of Interlaced Video With Overlapped 3D Transforms", Inventor: Joe Schoenblum.
U.S. Appl. No. 12/791,970, filed Jun. 2, 2010, entitled "Scene Change Detection and Handling for Preprocessing Video With Overlapped 3D Transforms", Inventor: Joe Schoenblum.
U.S. Appl. No. 12/791,987, filed Jun. 2, 2010, entitled "Staggered Motion Compensation for Preprocessing Video With Overlapped 3D Transforms", Inventor: Joe Schoenblum.
U.S. Appl. No. 13/646,795, filed Oct. 8, 2012 entitled "Combined Deblocking and Denoising Filter", Inventor: Schoenblum.
U.S. Appl. No. 13/926,703, filed Jun. 25, 2013 entitled "Scene Change Detection and Handling for Preprocessing Video with Overlapped 3D Transforms," Inventor: Schoenblum.
Kostadin Dabov et al., "Image denoising by sparse 3D transform-domain collaborative filtering", Aug. 2007, IEEE Transactions on Image Processing, vol. 16, No. 8, pp. 1-16.
Kostadin Dabov et al., "Color image denoising via sparse 3D collaborative filtering with grouping constraint in luminance-chrominance space", Jul. 2007, pp. I-313 to I-316.
Dmytro Rusanovskyy et al., "Video denoising algorithm in sliding 3D DCT domain", ACIVS 2005, Antwerp, Belgium, 8 pgs.
Kostadin Dabov et al., "Video denoising by sparse 3D transform-domain collaborative filtering", Sep. 2007, European Signal Processing Conference, Poznan, Poland, 5 pgs.
Dmytro Rusanovskyy et al., "Moving-window varying size 3D transform-based video denoising", VPQM'06, Scottdale, USA 2006, pp. 1-4.
Steve Gordon et al., "Simplified Use of 8x8 Transforms-Updated Proposal & Results", Joint Video Team (JVT) of ISO/IEC MPEG & ITU-T VCEG (ISO/IEC JTC1/SC29/WG11 and ITU-T SG16 Q.6, Mar. 2004, Munich, Germany, pp. 1-17.
T. Kasezawa, "Blocking artifacts reduction using discrete cosine transform", IEEE Transactions on Consumer Electronics, vol. 43, No. 1, Feb. 1997, pp. 48-55, New York: Institute of Electrical and Electronics Engineers.
Y. Nie et al., "Fast adaptive fuzzy post-filtering for coding artifacts removal in interlaced video", IEEE International conference on Acoustics, Speech, and Signal Processing, pp. ii/993-ii/996, New York: Institute of Electrical and Electronics Engineers, vol. 2, Mar. 2005.
A. Nosratinia, "Denoising JPEG images by re-application of JPEG", in 1998 IEEE Second Workshop on Multimedia Signal Processing, pp. 611-615, New York: Institute of Electrical and Electronics Engineers, Dec. 1998.
R. Samadani et al., "Deringing and deblocking Dct compression artifacts with efficient shifted transforms", 2004 ntemational Conference on Image Processing, pp. 1799-1802, Piscataway, New Jersey: Institute of Electrical and Electronics Engineers, vol. 3, No. Oct. 2004.
C. Wu et al., "Adaptive postprocessors with DCT-based block classifications", IEEE Transactions on Circuits and Systems for Video Technology, vol. 13, No. 5, May 2003, pp. 365-375, New York: Institute of Electrical and Electronics Engineers.
J. Canny, "A computational approach to edge detection", IEEE Trans Pattern Analysis and Machine Intelligence, vol. B, No. 6, Nov. 1986, pp. 679-698, Washington D.C.: IEEE Computer Society.
P. Dragotti et al., "Discrete directional wavelet bases for image compression", Visual Communications and Image Processing, Jul. 2003, Proceedings of SPIE, vol. 5150, pp. 1287-1295.
G. Triantafyllidis et al., "Blocking artifact detection and reduction in compressed data", IEEE Transactions on Circuits and Systems for Video Technology, vol. 12, No. 10, Oct. 2002, pp. 877-890, New York: Institute of Electrical and Electronics Engineers.
Huang et al., "Predictive subband image coding with wavelet transform", Signal Processing: Image Communication, vol. 13, No. 3, Sep. 1998, pp. 171-181.
Magarey et al., "Robust motion estimation using chrominance information in colour image sequences," In: "Lecture Notes in Computer Science", Dec. 31, 1997, Springer, vol. 1310/97, pp. 486-493, XP002596107.
Pizurica et al., "Noise reduction in video sequences using wavelet-domain and temporal filtering," Proceedings of SPIE, vol. 5266 Feb. 27, 2004, pp. 1-13, XP002596108.
Marpe et al., "H.264/MPEG4-AVC Fidelity Range Extensions: Tools, Profiles, Performance, and Application Areas," IEEE Conference on Image Processing, Nov. 14, 2005, 4 pgs.
U.S. Office Action dated Oct. 11, 2011 cited in U.S. Appl. No. 12/479,018, 17 pgs.
U.S. Office Action dated Oct. 12, 2011 cited in U.S. Appl. No. 12/479,147, 19 pgs.
U.S. Office Action dated Oct. 20, 2011 cited in U.S. Appl. No. 12/479,194, 19 pgs.
U.S. Office Action dated Nov. 23, 2011 cited in U.S. Appl. No. 12/479,244, 22 pgs.
U.S. Office Action dated Jun. 4, 2012 cited in U.S. Appl. No. 12/479,104, 29 pgs.
U.S. Final Office Action dated Jul. 3, 2012 cited in U.S. Appl. No. 12/479,018, 19 pgs.
U.S. Office Action dated Jul. 17, 2012 cited in U.S. Appl. No. 12/479,147, 13 pgs.
U.S. Office Action dated Aug. 6, 2012 cited in U.S. Appl. No. 12/479,065, 18 pgs.
U.S. Final Office Action dated Aug. 7, 2012 cited in U.S. Appl. No. 12/479,244, 20 pgs.
U.S. Final Office Action dated Aug. 10, 2012 cited in U.S. Appl. No. 12/479,194, 17 pgs.
U.S. Office Action dated Nov. 8, 2012 cited in U.S. Appl. No. 12/791,970, 12 pgs.
U.S. Final Office Action dated Nov. 29, 2012 cited in U.S. Appl. No. 12/479,147, 14 pgs.
U.S. Office Action dated Jan. 3, 2013 cited in U.S. Appl. No. 12/479,244, 18 pgs.
U.S. Office Action dated Jan. 31, 2013 cited in U.S. Appl. No. 12/479,018, 14 pgs.
U.S. Office Action dated Feb. 12, 2013 cited in U.S. Appl. No. 12/479,194, 15 pgs.
U.S. Office Action dated Mar. 4, 2013 cited in U.S. Appl. No. 12/479,065, 11 pgs.
U.S. Office Action dated Apr. 23, 2013 cited in U.S. Appl. No. 12/791,987, 14 pgs.
U.S. Final Office Action dated May 20, 2013 cited in U.S. Appl. No. 12/479,147, 14 pgs.
U.S. Office Action dated Apr. 3, 2017 cited in U.S. Appl. No. 14/992,341, 45 pgs.

* cited by examiner

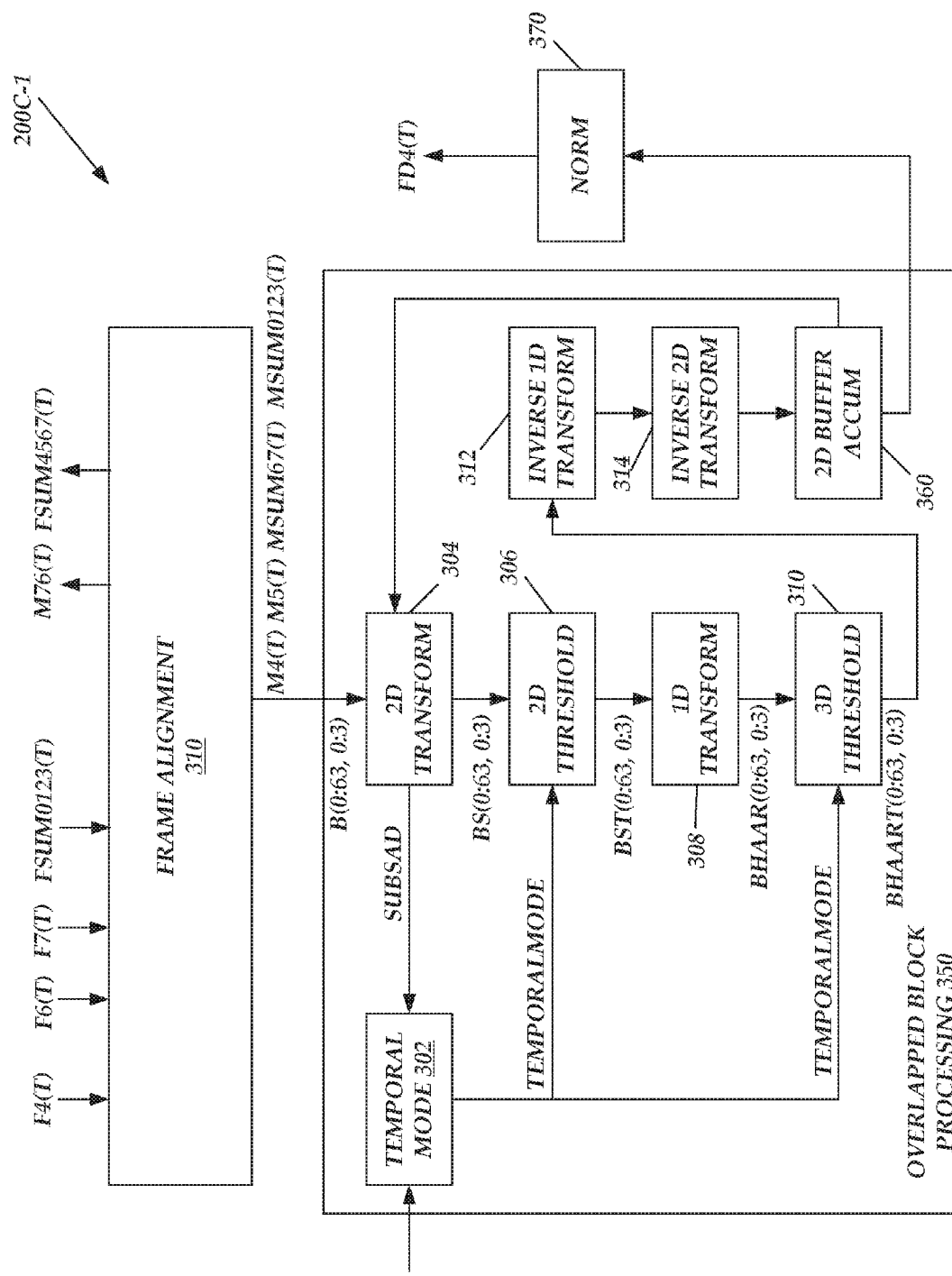

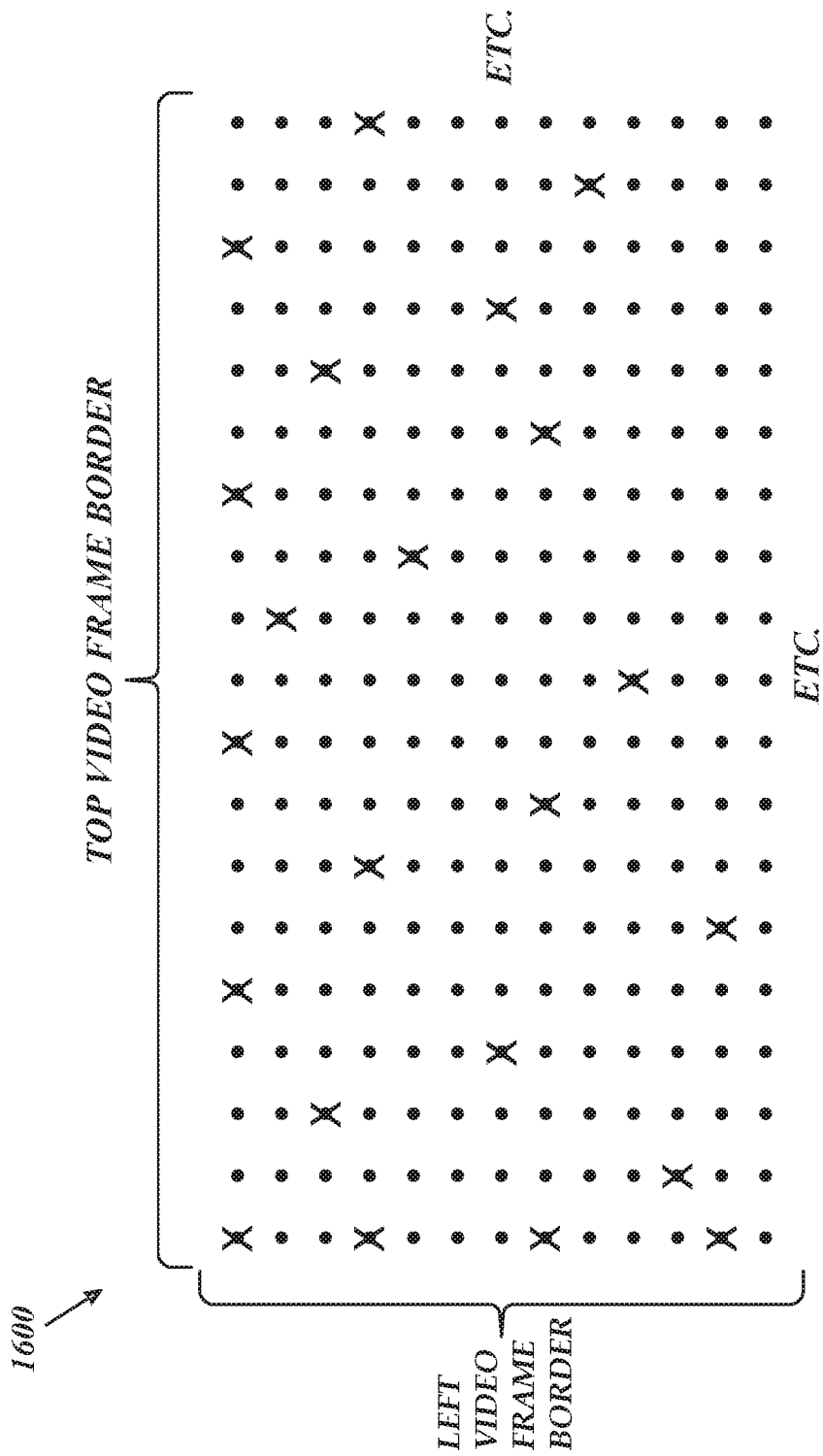

$M_{8x8\_LOW} =$ 0.5 0.6 0.7 0.7 0.7 0.7 0.6 0.5
0.6 1.0 1.0 1.0 1.0 1.0 1.0 0.6
0.7 1.0 1.0 1.0 1.0 1.0 1.0 0.7
0.7 1.0 1.0 1.0 1.0 1.0 1.0 0.7
0.7 1.0 1.0 1.0 1.0 1.0 1.0 0.7
0.7 1.0 1.0 1.0 1.0 1.0 1.0 0.7
0.6 1.0 1.0 1.0 1.0 1.0 1.0 0.6
0.5 0.6 0.7 0.7 0.7 0.7 0.6 0.5

FIG. 20

REDUCED COMPLEXITY VIDEO FILTERING USING STEPPED OVERLAPPED TRANSFORMS

TECHNICAL FIELD

The present disclosure relates generally to video noise reduction.

BACKGROUND

Filtering of noise in video sequences is often performed to obtain as close to a noise-free signal as possible. Spatial filtering requires only the current frame (i.e., picture) to be filtered and not surrounding frames in time. Spatial filters, when implemented without temporal filtering, may suffer from blurring of edges and detail. For this reason and the fact that video tends to be more redundant in time than space, temporal filtering is often employed for greater filtering capability with less visual blurring. Since video contains both static scenes and objects moving with time, temporal filters for video include motion compensation from frame to frame for each part of the moving objects to prevent trailing artifacts of the filtering.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a block diagram that illustrates one example VDN system embodiment comprising frame alignment and overlapped block processing modules.

FIG. 16 shows a video frame.

FIG. 19 shows a weighting matrix.

FIG. 20 shows a weighting matrix.

DETAILED DESCRIPTION EXAMPLE EMBODIMENTS

Overview

Figure 1:
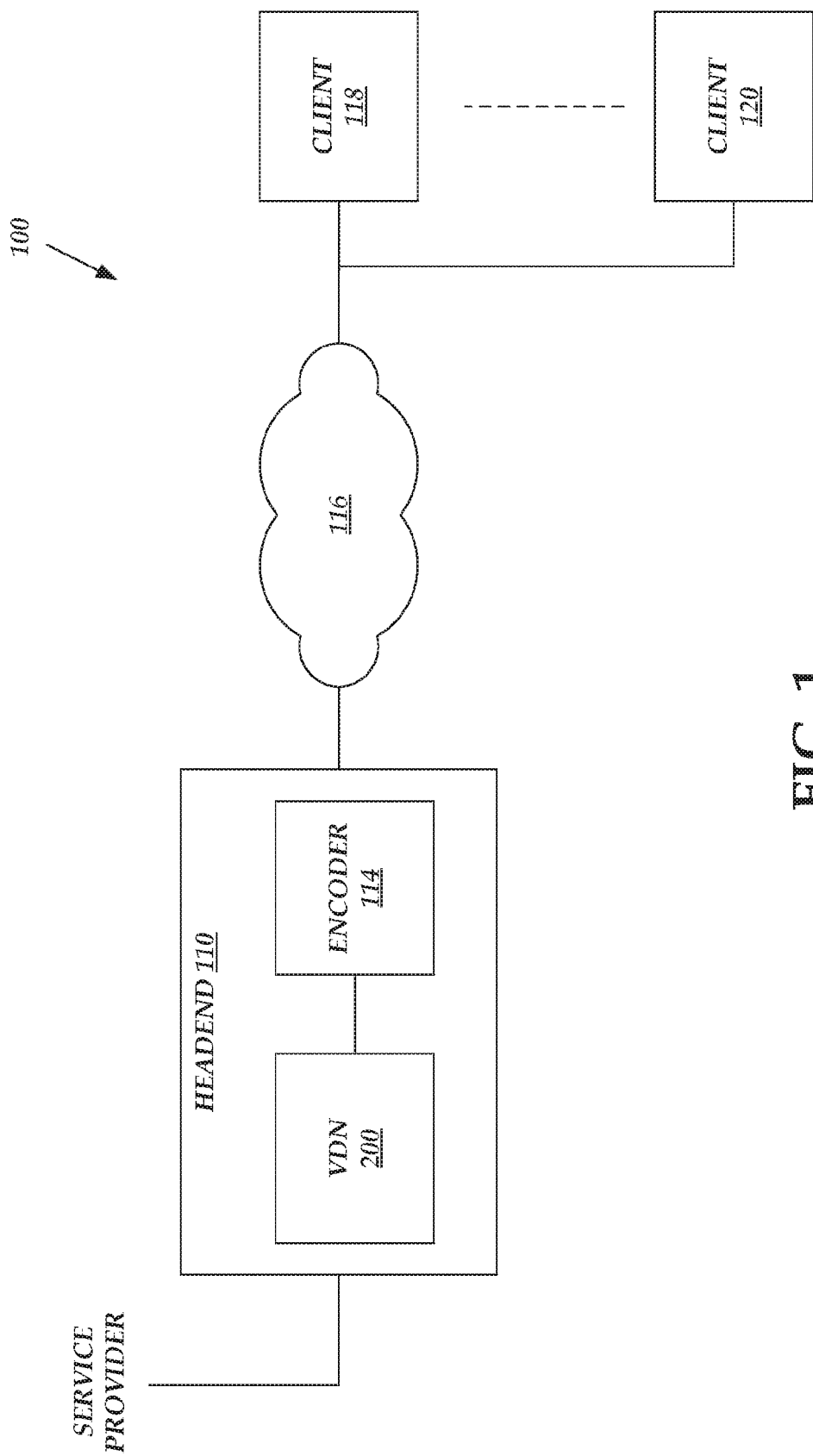
FIG. 1 is a block diagram that illustrates an example environment in which video denoising (VDN) systems and methods can be implemented.

Pseudorandom overlapped block processing may be provided. First, a first temporal sequence of video frames corrupted with noise may be received. Next, matched frames may be producing by frame matching video frames of the first temporal sequence according to a first stage of processing. Then the matched frames may be denoised according to a second stage of processing. The second stage of processing may commence responsive to completion of the first stage of processing for all the video frames of the first temporal sequence. The second stage of processing may comprise overlapped block processing. The overlapped block processing may comprise pseudorandom overlapped block processing having no successive pixels both horizontally and vertically that are one-sized in transforms.

Example Embodiments

Disclosed herein are various example embodiments of video denoising (VDN) systems and methods (collectively, referred to herein also as a VDN system or VDN systems) that comprise a frame alignment module and an overlapped block processing module, the overlapped block processing module configured to denoise video in a three-dimensional (3D) transform domain using motion compensated overlapped 3D transforms. In particular, certain embodiments of VDN systems motion compensate a set of frames surrounding a current frame, and denoise the frame using 3D spatio-temporal transforms with thresholding of the 2D and/or 3D transform coefficients. One or more VDN system embodiments provide several advantages or distinctive features over brute force methods of conventional systems, including significantly reduced computational complexity that enable implementation in real-time silicon (e.g., applicable to real-time applications, such as pre-processing of frames for real-time broadcasting of encoded pictures of a video stream), such as non-programmable or programmable hardware including field programmable gate arrays (FPGAs), and/or other such computing devices. Several additional distinctive features and/or advantages, explained further below, include the decoupling of block matching and inverse block matching from an overlapped block processing loop, reduction of accumulation buffers from 3D to 2D+n (where n is an integer number of accumulated frames less than the number of frames in a 3D buffer), and the "collapsing" of frames (e.g., taking advantage of the fact that neighboring frames have been previously frame matched to reduce the amount of frames entering the overlapped block processing loop while obtaining the benefit of the information from the full scope of frames from which the reduction occurred for purposes of denoising). Such features and/or advantages enable substantially reduced complexity block matching. Further distinctive features include, among others, a customized-temporal transform and temporal depth mode selection, also explained further below.

These advantages and/or features, among others, are described hereinafter in the context of an example subscriber television network environment, with the understanding that other video environments may also benefit from certain embodiments of the VDN systems and methods and hence are contemplated to be within the scope of the disclosure. Though specifics for one or more embodiments are disclosed herein, such specifics as described are not necessarily part of every embodiment.

FIG. 1 is a block diagram of an example environment, a subscriber television network 100, in which certain embodiments of VDN systems and/or methods may be implemented. The subscriber television network 100 may include a plurality of individual networks, such as a wireless network and/or a wired network, including wide-area networks (WANs), local area networks (LANs), among others. The subscriber television network 100 includes a headend 110 that receives (and/or generates) video content, audio content, and/or other content (e.g., data) sourced at least in part from one or more service providers, processes and/or stores the content, and delivers the content over a communication medium 116 to one or more client devices 118 through 120. The headend 110 comprises an encoder 114 having video compression functionality, and a pre-processor or VDN system 200 configured to receive a raw video sequence (e.g., uncompressed video frames or pictures), at least a portion of which (or the entirety) is corrupted by noise. Such noise may be introduced via camera sensors, from previously encoded frames (e.g., artifacts introduced by a prior encoding process from which the raw video was borne, among other sources). The VDN system 200 is configured to denoise each picture or frame of the video sequence and provide the denoised pictures or frames to the encoder 114, enabling, among other benefits, the encoder to encode fewer bits than if noisy frames were inputted to the encoder. In some embodiments, at least a portion of the raw video sequence may bypass the VDN system 200 and be fed directly into the encoder 114.

Throughout the disclosure, the terms pictures and frames are used interchangeably. In some embodiments, the uncompressed video sequences may be received in digitized format, and in some embodiments, digitization may be performed in the VDN system 200. In some embodiments, the VDN system 200 may comprise a component that may be physically and/or readily de-coupled from the encoder 114 (e.g., such as in the form of a plug-in-card that fits in a slot or receptacle of the encoder 114). In some embodiments, the VDN system 200 may be integrated in the encoder 114 (e.g., such as integrated in an applications specific integrated circuit or ASIC). Although described herein as a pre-processor to a headend component or device, in some embodiments, the VDN system 200 may be co-located with encoding logic at a client device, such as client device 118, or positioned elsewhere within a network, such as at a hub or gateway.

The headend 110 may also comprise other components, such as QAM modulators, routers, bridges, Internet Service Provider (ISP) facility servers, private servers, on-demand servers, multi-media messaging servers, program guide servers, gateways, multiplexers, and/or transmitters, among other equipment, components, and/or devices. Communication of Internet Protocol (IP) packets between the client devices 118 through 120 and the headend 110 may be implemented according to one or more of a plurality of different protocols, such as user datagram protocol (UDP)/IP, transmission control protocol (TCP)/IP, among others.

In one embodiment, the client devices 118 through 120 comprise set-top boxes coupled to, or integrated with, a display device (e.g., television, computer monitor, etc.) or other communication devices and further coupled to the communication medium 116 (e.g., hybrid-fiber coaxial (HFC) medium, coaxial, optical, twisted pair, etc.) via a wired connection (e.g., via coax from a tap) or wireless connection (e.g., satellite). In some embodiments, communication between the headend 110 and the client devices 118 through 120 comprises bi-directional communication over the same transmission medium 116 by which content is received from the headend 110, or via a separate connection (e.g., telephone connection). In some embodiments, communication medium 116 may comprise of a wired medium, wireless medium, or a combination of wireless and wired media, including by way of non-limiting example Ethernet, token ring, private or proprietary networks, among others. Client devices 118 through 120 may henceforth comprise one of many devices, such as cellular phones, personal digital assistants (PDAs), computer devices or systems such as laptops, personal computers, set-top terminals, televisions with communication capabilities, DVD/CD recorders, among others. Other networks are contemplated to be within the scope of the disclosure, including networks that use packets incorporated with and/or compliant to other transport protocols or standards.

The VDN system 200 may be implemented in hardware, software, firmware, or a combination thereof. To the extent certain embodiments of the VDN system 200 or a portion thereof are implemented in software or firmware, executable instructions for performing one or more tasks of the VDN system 200 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VDN system 200 or a portion thereof are implemented in hardware, the VDN system 200 may be implemented with any or a combination of the following technologies, which are all well known in the art: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 2A:
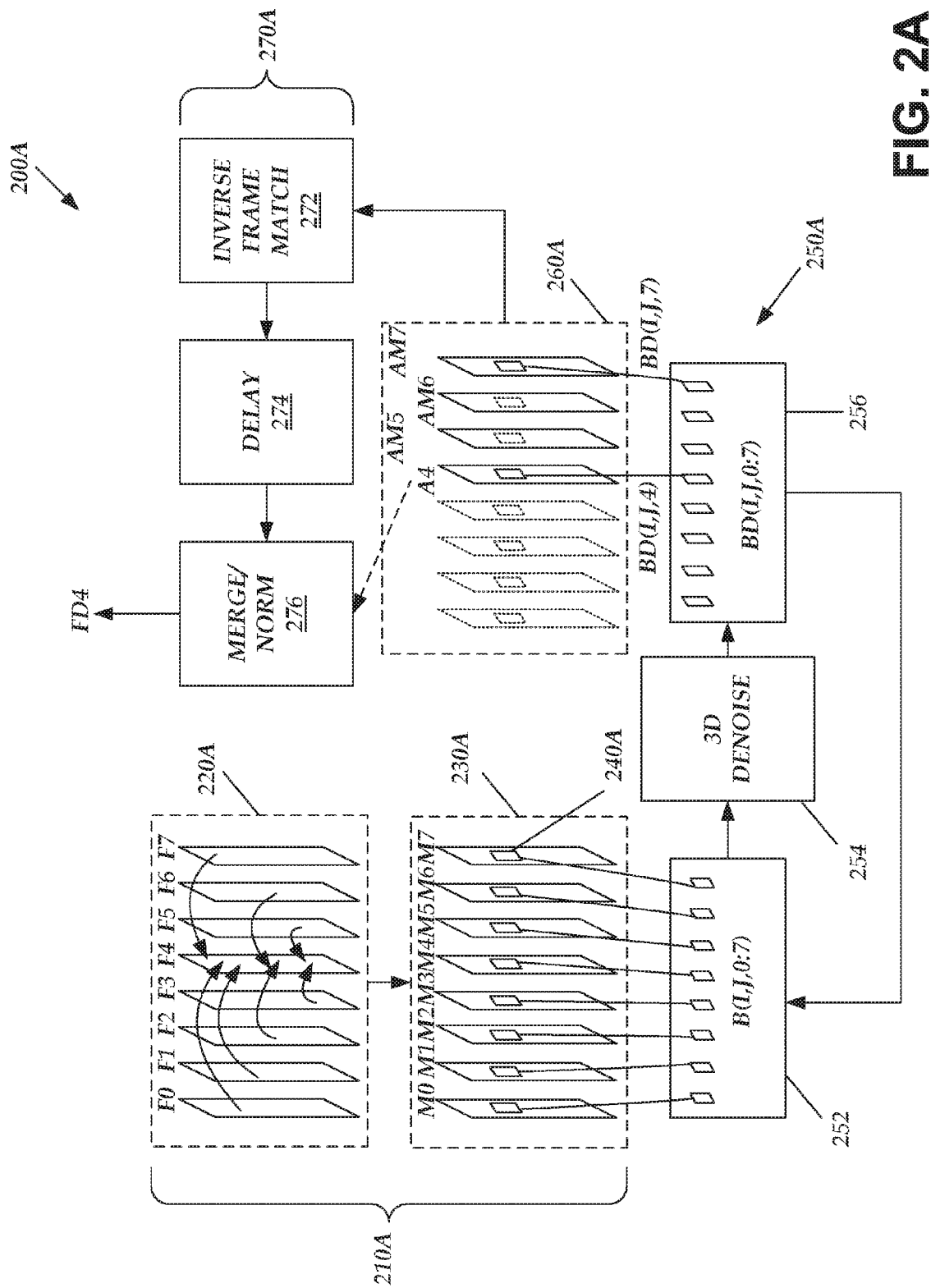
FIGS. 2A-2C are schematic diagrams that conceptually illustrate processing implemented by various example embodiments of VDN systems and methods.
Figure 2B:
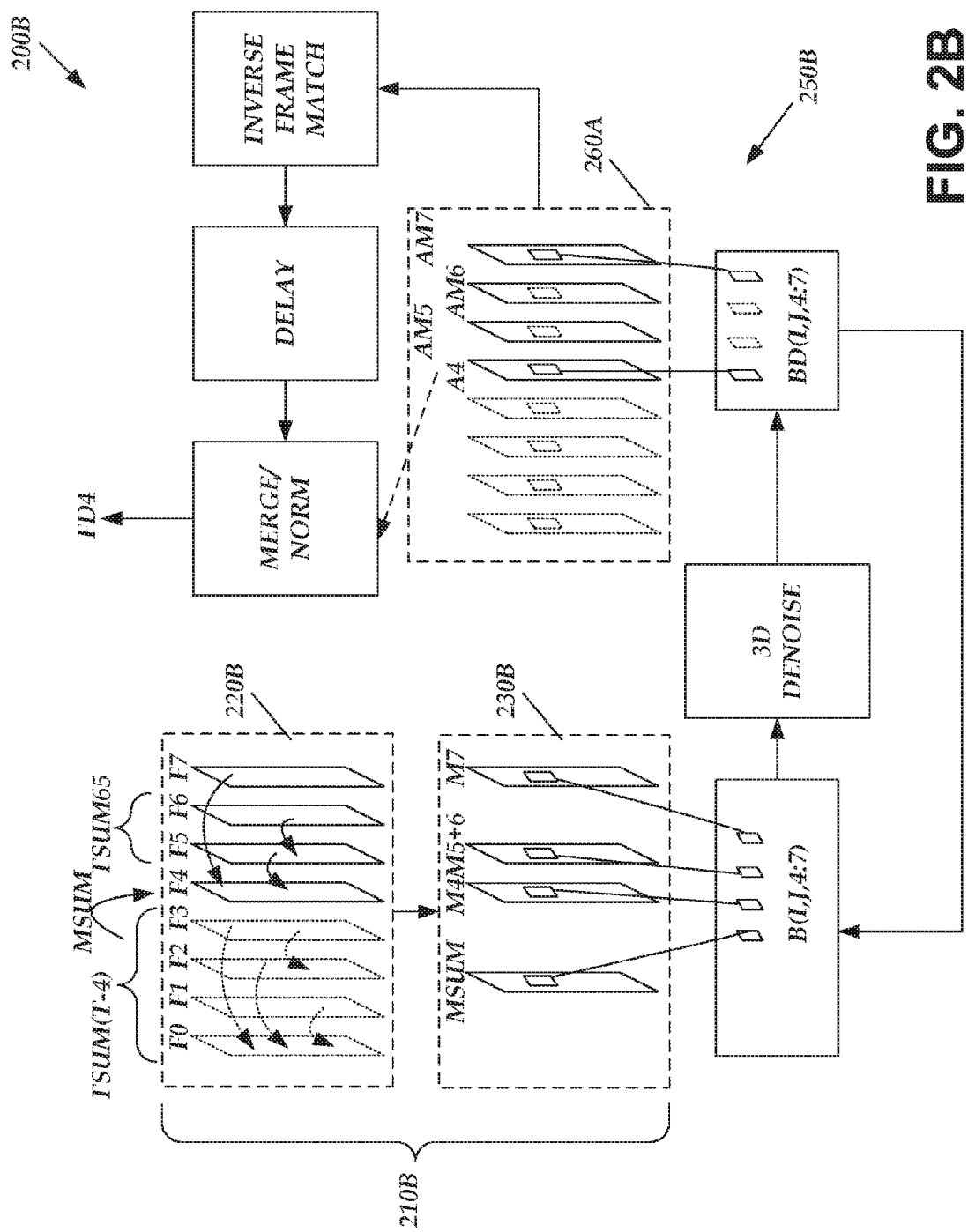
Figure 2C:
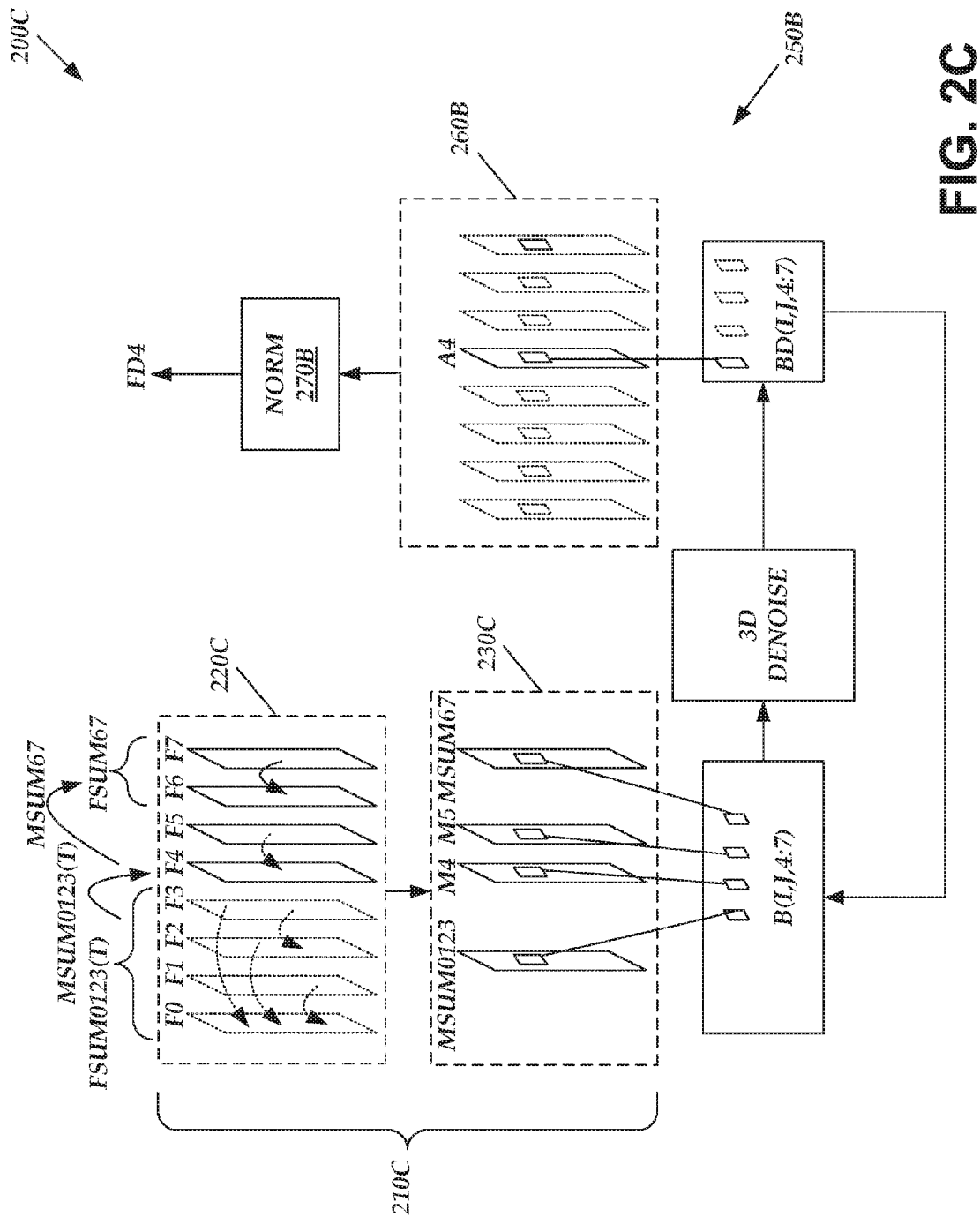

Having described an example environment in which the VDN system 200 may be employed, attention is directed to FIGS. 2A-2C, which comprise schematic diagrams that conceptually illustrate data flows and/or processing implemented by various example embodiments of VDN systems and methods. Progressing from FIG. 2A to FIG. 2B and then to FIG. 2C represents a reduction in processing complexity, and hence like-processing throughout these three figures are denoted with the same numerical reference and an alphabetical or alphanumeric suffix (e.g., a, b, and c, or a-1, etc.)

that may change from each figure for a given component or diagram depending on whether there is a change or reduction in complexity to the component or represented system 200. Further, each "F" (e.g., F0, F1, etc.) shown above component 220a in FIG. 2A (and likewise shown and described in association with other figures) is used to denote frames that have not yet been matched to the reference frame (F4), and each "M" (e.g., M0, M1, etc.) is used to denote frames that have been matched (e.g., to the reference frame). Note that use of the term "component" with respect to FIGS. 2A-2C does not imply that processing is limited to a single electronic component, or that each "component" illustrated in these figures are necessarily separate entities. Instead, the term "component" in these figures graphically illustrates a given process implemented in the VDN system embodiments, and is used instead of "block," for instance, to avoid confusion in the term, block, when used to describe an image or pixel block.

Overall, VDN system embodiment, denoted 200a in FIG. 2A, can be subdivided into frame matching 210a, overlap block processing 250a, and post processing 270a. In frame matching 210a, entire frames are matched at one time (e.g., a single time or single processing stage), and hence do not need to be matched during implementation of overlapped block processing 250a. In other words, block matching in the frame matching process 210a is decoupled (e.g., blocks are matched without block overlapping in the frame matching process) from overlapped block processing 250a, and hence entire frames are matched and completed for a given video sequence before overlapped block processing 250a is commenced for the given video sequence. By decoupling frame matching 210a from overlapped block processing 250a, block matching is reduced by a factor of sixty-four (64) when overlapped block processing 250a has a step size of s=1 pixel in both the vertical and horizontal direction (e.g., when compared to integrating overlapped block processing 250a with the frame matching 210a). If the step size is s=2, then block matching is reduced by a factor of sixteen (16). Various step sizes are contemplated to be within the scope of the disclosure, the selection of which is based on factors such as available computational resources and video processing performance (e.g., based on evaluation of PSNR, etc.).

Shown in component 220a are eight (8) inputted contiguous frames, F0(t) through F7(t) (denoted above each symbolic frame as F0, F1, etc.). The eight (8) contiguous frames correspond to a received raw video sequence of plural frames. In other words, the eight (8) contiguous frames correspond to a temporal sequence of frames. For instance, the frames of the raw video sequence are arranged in presentation output order (which may be different than the transmission order of the compressed versions of these frames at the output of the headend 110). In some embodiments, different arrangements of frames and/or different applications are contemplated to be within the scope of the disclosure. Note that quantities fewer or greater than eight frames may be used in some embodiments at the inception of processing. Frame matching (e.g., to FIG. 4) is symbolized in FIGS. 2A-2C by the arrow head lines, such as represented in component 220a (e.g., from F0 to F4, etc.). As illustrated by the arrow head lines, frames F0(t) through F3(t) are matched to F4(t), meaning that blocks (e.g., blocks of pixels or image blocks, such as 8×8, 8×4, etc.) have been selected from those frames which most closely match blocks in F4(t) through a motion estimation/motion compensation process as explained below. The result of frame matching is a set of frames M0(t) through M7(t), where M4(t)=F4(t), as shown in component 230a. Frames M0(t) through M7(t) are all estimates of F4(t), with M4(t)=F4(t) being a perfect match. M4(t) and F4(t) are used interchangeably herein.

Overlapped block processing 250a is symbolically represented with components 252 (also referred to herein as a group of matched noisy blocks or similar), 254 (also referred to herein as 3D denoising or similar), 256 (also referred to as a group or set of denoised blocks or similar), and 260a (also referred to herein as pixel accumulation buffer(s)). Overlapped block processing 250a moves to a pixel location i,j in each of the matched frames (e.g., the same, co-located, or common pixel location), and for each loop, takes in an 8×8 noisy block b(i,j,t) (e.g., 240a) from each matched frame M0 through M7, with the top left corner at pixel position i,j, so that b(i,j,t)=Mt(i:i+7, j:j+7). Note that i,j are vertical and horizontal indices which vary over the entire frame, indicating the position in the overlapped processing loop. For instance, for a step size s=1, i,j takes on every pixel position in the frame (excluding boundaries of 7 pixels). For a step size s=2 i,j takes on every other pixel. Further note that 8×8 is used as an example block size, with the understanding that other block sizes may be used in some embodiments of overlapped block processing 250a. The group of eight (8) noisy 8×8 blocks (252) is also denoted as b(i,j,0:7). Note that the eight (8) noisy blocks b(i,j, 0:7) (252) are all taken from the same pixel position i,j in the matched frames, since frame alignment (as part of frame matching processing 210a) is accomplished previously. Frame matching 210a is decoupled from overlapped block processing 250a.

3D denoising 254 comprises forward and inverse transforming (e.g., 2D followed by 1D) and thresholding (e.g., 1D and/or 2D), as explained further below. In general, in 3D denoising 254, a 2D transform is performed on each of the 8×8 noisy blocks (252), followed by a 1D transform across the 2D transformed blocks. After thresholding, the result is inverse transformed (e.g., 1D, then 2D) back to pixel blocks. The result is a set of eight (8) denoised blocks bd(i,j, 0:7) (256).

For each loop, there are eight (8) denoised blocks (256), but in some embodiments, not all of the blocks of bd(i,j, 0:7) are accumulated to the pixel accumulation buffers 260a, as symbolically represented by the frames and blocks residing therein in phantom (dashed lines). Rather, the accumulation buffers 260a comprise what is also referred to herein as 2D+c accumulation buffers 260a, where c represents an integer value corresponding to the number of buffers for corresponding frames of denoised blocks in addition to the buffer for A4. A 2D accumulation buffer corresponds to only A4 (the reference frame) being accumulated using bd(i,j,4) (e.g., denoised blocks bd(i,j,4) corresponding to frame A4 are accumulated). In this example, another buffer corresponding to c=1 is shown as being accumulated, where the c=1 buffer corresponds to denoised blocks bd(i,j,7) corresponding to frame AM7. It follows that for an eight (8) frame window, a 2D+7 accumulation buffer equals a 3D accumulation buffer. Further, it is noted that using a 2D+1 accumulation buffer is analogous in the time dimension to using a step size s=4 in the spatial dimension (i.e., the accumulation is decimated in time). Accordingly, c can be varied (e.g., from 0 to a defined integer) based on the desired visual performance and/or available computational resources. However, in some embodiments, a 3D accumulation buffer comprising denoised pixels from plural overlapped blocks is accumulated for all frames.

In overlapped block processing 250a, blocks bd(i,j,4) and bd(i,j,7) are accumulated in accumulation buffers 260a at pixel positions i,j since the accumulation is performed in the matched-frame domain, circumventing any need for inverse block matching within the overlapped block processing loop 250a. Further, uniform weighting (e.g., w(i,j)=1 or no weighting at all) for all denoised blocks is implemented, which significantly reduces complexity. Note that in some embodiments, non-uniform weighting may be implemented. Note that in some embodiments, buffers for more than two frames (e.g., c>1) may be implemented. For a 2D+1 buffer, a frame begins denoising when it becomes A7, since there is an accumulation buffer for A7 for the 2D+1 accumulation buffer 260a. A7 receives a second ($2^{nd}$) iteration of denoising when it becomes A4. The two are merged as shown in post-processing 270a, as explained further below.

From the accumulation buffers 260a, post processing 270a is implemented, which comprises in one embodiment the processes of inverse frame matching 272 (e.g., as implemented in an inverse frame matching module or logic), delay 274 (e.g., as implemented in a delay module or logic), and merge and normalizing 276 (e.g., as implemented in merge and normalize module or logic). Since in one embodiment the accumulation buffer corresponding to AM7 is in the matched frame domain (e.g., frame 7 matched to frame 4), after the overlapped block processing is completed, data flow advances to inverse frame matching 272 to inverse frame match AM7(t) to obtain A7(t). As noted, this operation occurs once outside of overlapped block processing 250a. A7(t) is then delayed (274), in this example, three frames, and merged (added) and normalized 276 to A4(t) (as represented by the dotted line arrowhead) to output FD4(t), the denoised frame. Had the inverse frame matching 272 been implemented in the overlapped block processing 250a, the inverse frame matching would move a factor of sixty-four (64) more blocks than the implementation shown for a step size s=1, or a factor of 16 more for s=2.

Ultimately, after the respective blocks for each accumulated frame have been accumulated from plural iterations of the overlapped block processing 250a, the denoised and processed frame FD4 is output to the encoder or other processing devices in some embodiments. As explained further below, a time shift is imposed in the sequence of frames corresponding to frame matching 210a whereby one frame (e.g., F0) is removed and an additional frame (not shown) is added for frame matching 210a and subsequent denoising according to a second or subsequent temporal frame sequence or temporal sequence (the first temporal sequence associated with the first eight (8) frames (F0-F7) discussed in this example). Accordingly, after one iteration of frame processing (e.g., frame matching 210a plus repeated iterations or loops of overlapped block processing 250a), as illustrated in the example of FIG. 2A, FD4(t) is output as a denoised version of F4(t). As indicated above, all of the frames F0(t) through F7(t) shift one frame (also referred to herein as time-shifted) so that F0(t+1)=F1(t), F1(t+1)=F2(t), etc., and a new frame F7(t+1) (not shown) enters the "window" (component 220a) of frame matching 210a. Note that in some embodiments, greater numbers of shifts can be implemented to arrive at the next temporal sequence. Further, F0(t) is no longer needed at t+1 so one frame leaves the window (e.g., the quantity of frames outlined in component 220a). For the 8-frame case, as one non-limiting example, there is a startup delay of eight (8) frames, and since three (3) future frames are needed to denoise F4(t) and F5 through F7, there is general delay of three (3) frames.

Referring now to FIG. 2B, shown is a VDN system embodiment, denoted 200b, with further reduced computational complexity compared to the VDN system embodiment 200a illustrated in FIG. 2A. The simplification in FIG. 2B is at least partially the result of the 2D+1 accumulation buffers 260a and a modified 1D temporal transform, as explained further below. In the above-description of the 2D+1 accumulation buffers 260a in FIG. 2A, it is noted that the 2D+1 accumulation buffers 260a require only buffers (e.g., two) for denoised blocks, bd(i,j,4) and bd(i,j,7). Accordingly, a further reduction in complexity includes the "collapse" of the left four (4) frames, F0 through F3, into a single summation-frame FSUM, and frame-matching the summation-frame to F4, as illustrated in frame matching 210b, and in particular, component 220b of FIG. 2B. The collapse to a single summation frame comprises an operation which represents a close approximation to the left-hand side frame matching 210a illustrated in FIG. 2A. Since F0 through F3 were previously matched together at time t−4, no matching operations are needed on those individual frames. Instead, frame matching 210b matches the sum, FSUM, from time t−4 to F4, where $$FSUM(t-4) = \sum_{j=4}^{7} Mj(t-4) FSUM(t-4) = \sum_{j=4}^{7} Mj(t-4).$$ Eq. (1)

Eq. (1) implies that FSUM(t) is the sum of the four (4) frame-matched F4 through F7 frames, denoted M4(t) through M7(t) at time t, and is used four (4) frames (t−4) later as the contribution to the left (earliest) four (4) frames in the 3D transforms. A similar type of simplification is made with respect to frames F5 and F6. After the four (4) frames F0 through F3 are reduced to one FSUM frame, and F5 and F6 are reduced to a single frame, and then matched to F4(t), there are only four (4) matched frames, MSUM (actually MSUM0123), M4, M5+6, and M7, as noted in component 230b, and therefore the entire overlapped block processing 250b proceeds using just four (4) (b(i,j,4:7)) matched frames. The number of frames in total that need matching to F4(t) is reduced to three (3) in the VDN system embodiment 200b of FIG. 2B from seven (7) in the VDN system embodiment 200a in FIG. 2A. In other words, overlapped block processing 250b receives as input the equivalent of eight (8) frames, hence obtaining the benefit of eight (8) frames using a fewer number of frame estimates.

FIG. 2C is a block diagram of a VDN system embodiment, 200c, that illustrates a further reduction in complexity from the system embodiments in FIGS. 2A-2B, with particular emphasis at the accumulation buffers denoted 260b. In short, the accumulation buffer 260b comprises a 2D accumulation buffer, which eliminates the need for inverse motion compensation and reduces the complexity of the post-accumulating processing 270b to a normalization block. In this embodiments, the frames do not need to be rearranged into the frame-matching (e.g., component 220b) as described above in association with FIG. 2B. Instead, as illustrated in the frame matching 210c, F7 is matched to F6, and the result is added together to obtain FSUM67. F5 is matched to F4 using the motion vectors from two (2) frames earlier (when F5, F4 were positioned in time at F7, F6 respectively), so this manner of frame matching is shown as a dotted line between F4 and F5 in component 220c in FIG. 2C. As before, FSUM0123 represents four (4) frames matched, four (4) frames earlier, and summed together. In summary, frame matching 210c for the 2D accumulation buffer 260b matches three (3) frames to F4: FSUM0123, FSUM67 and F5.

Having described conceptually example processing of certain embodiments of VDN systems 200, attention is now directed to FIG. 3, which comprises a block diagram of VDN system embodiment 200c-1. The architecture and functionality described hereinafter is based on VDN system embodiment 200c described in association with FIG. 2C. VDN system embodiment 200c-1 comprises a frame alignment module 310, an overlapped block processing module 350, an accumulation buffer 360, and a normalization module 370 (post-accumulation processing). It is noted that frame processing 250 in FIGS. 2A-2C correspond to the processing implemented by the frame alignment module 310, and overlap block processing 250 corresponds to the processing implemented by the overlapped block processing module 350. In addition, the 2D accumulation buffer 360 and the normalization module 370 implement processing corresponding to the components 260 and 270, respectively, in FIG. 2C. Note that in some embodiments, functionality may be combined into a single component or distributed among more or different modules.

As shown in FIG. 3, the frame alignment module 310 receives plural video frames F4(t), F6(t), and F7(t), where F4(t) is the earliest frame in time, and t is the time index which increments with each frame. The frame FSUM0123 (t)=FSUM4567(t−4) represents the first four (4) frames F0(t) through F3(t) (F4(t−4) through F7(t−4)) which have been matched to frame F0(t) (F4(t−4)) previously at time t=t−4. Note that for interlaced video, the frames may be separated into fields and the VDN system embodiment 200c-1 may be run separately (e.g., separate channels, such as top channel and bottom channel) on like-parity fields (e.g., top or bottom), with no coupling. Throughout this disclosure, the term "frame" is used with the understanding that the frame can in fact be an individual field with no difference in processing. The frame alignment module 310 produces the following frames for processing by the overlapped block processing module 350, the details of which are described below: M4(t), MSUM67(t), M5(t), and MSUM0123(t).

Figure 4A:
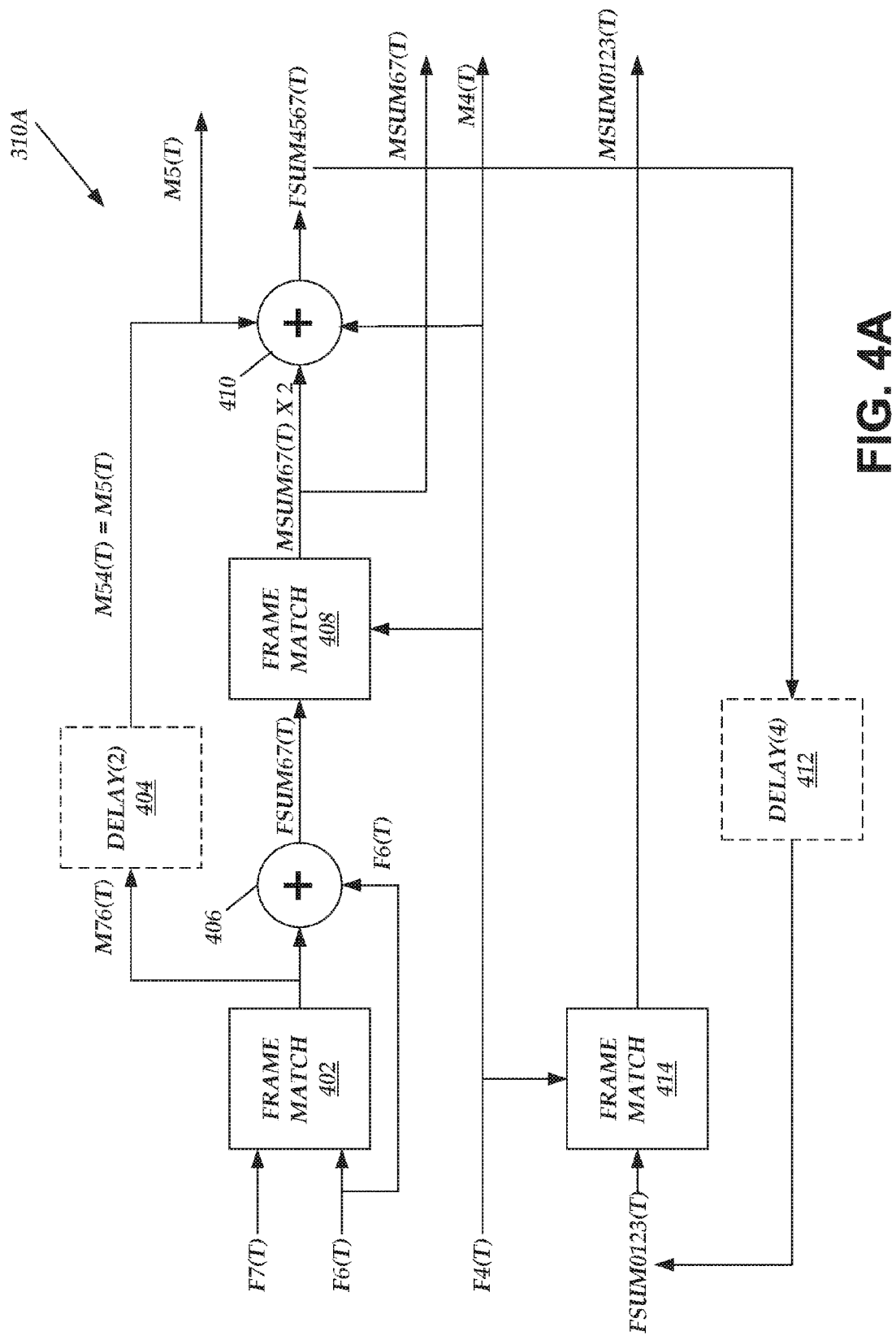
FIG. 4A is a block diagram that illustrates one example embodiment of a frame alignment module.
Figure 4B:
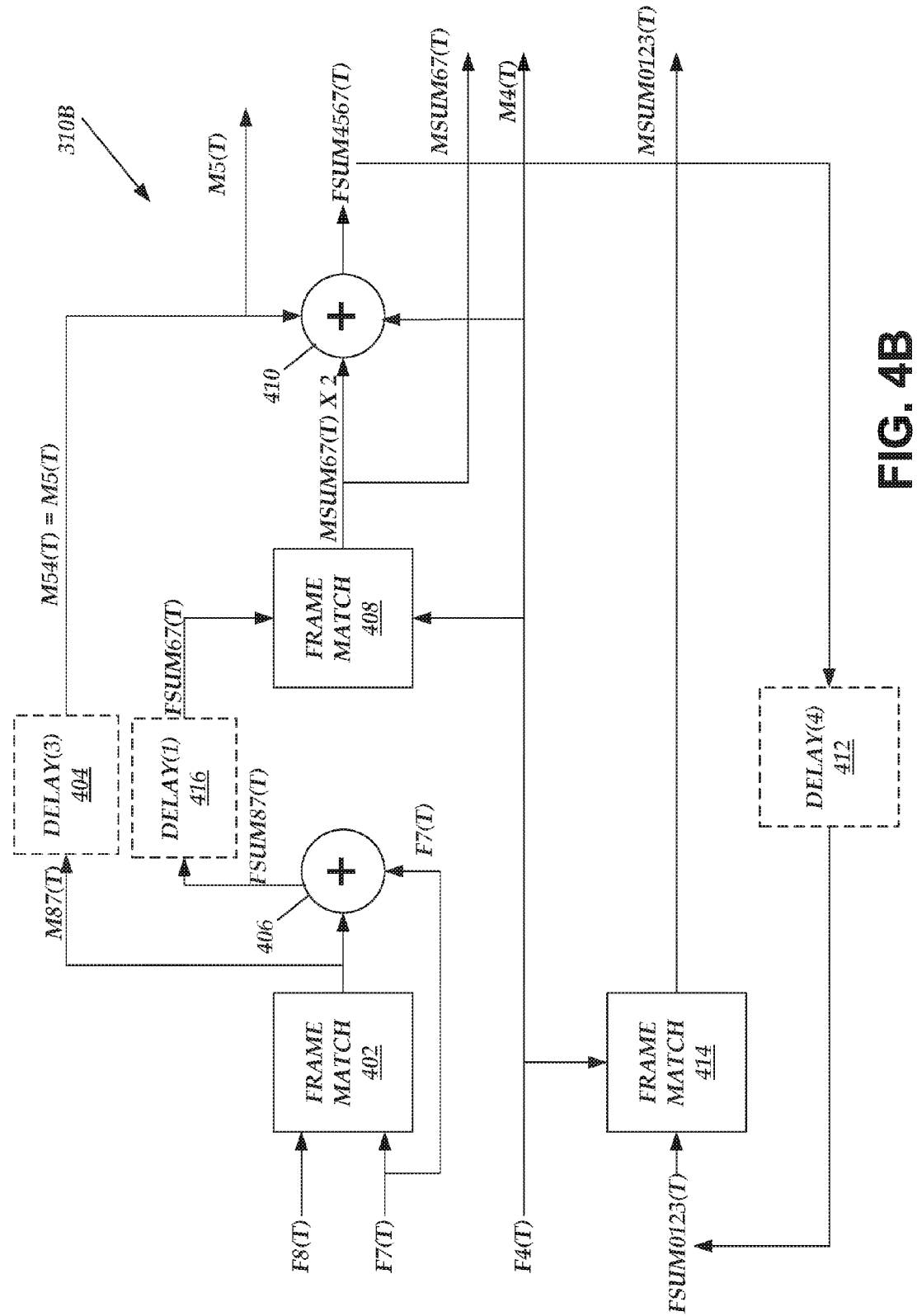
FIG. 4B is a block diagram that illustrates another example embodiment of a frame alignment module.

Before proceeding with the description of the overlapped block processing module 350, example embodiments of the frame alignment module 310 are explained below and illustrated in FIGS. 4A and 4B. One example embodiment of a frame alignment module 310a, shown in FIG. 4A, receives frames F4(t), F6(t), F7(t), and FSUM0123(t). It is noted that M5(t) is the same as M76(t−2), which is the same as M54(t). F7(t) is frame-matched to F6(t) at frame match module 402, producing M76(t). After a delay (404) of two (2) frames, M76(t) becomes M54(t), which is the same as M5(t). Note that blocks labeled "delay" and shown in phantom (dotted lines) in FIGS. 4A-4B are intended to represent delays imposed by a given operation, such as access to memory. F6(t) is summed with M76(t) at summer 406, resulting in FSUM67(t). FSUM67(t) is frame-matched to F4(t) at frame match module 408, producing MSUM67(t). MSUM67(t) is multiplied by two (2) and added to F4(t) and M5(t) at summer 410, producing FSUM4567(t). FSUM4567(t) can be viewed as frames F5(t) through F7(t) all matched to F4(t) and summed together along with F4(t). FSUM4567(t) is delayed (412) by four (4) frames producing FSUM0123(t) (i.e., FSUM4567(t−4)=FSUM0123(t)). FSUM0123(t) is frame-matched to F4(t) at frame match module 414 producing MSUM0123(t). Accordingly, the output of the frame alignment module 310a comprises the following frames: MSUM0123(t), M4(t), M5(t), and MSUM67(t).

The context of the present disclosure that equivalent frame processing to that illustrated in FIG. 4 may be realized by the imposition of different delays in the process, and hence use of different time sequences of frames in a given temporal sequence as the input. For instance, as shown in FIG. 4B, for frame alignment module 310b, an extra frame delay 416 corresponding to the derivation of frames F6(t) and F7(t) from FSUM87(t) may be inserted, resulting in frames FSUM67(t). All other modules function are as explained above in association with FIG. 4A, and hence omitted here for brevity. Such a variation to the embodiment described in association with FIG. 4A enables all frame-matching operations to work out of memory.

Figure 5:
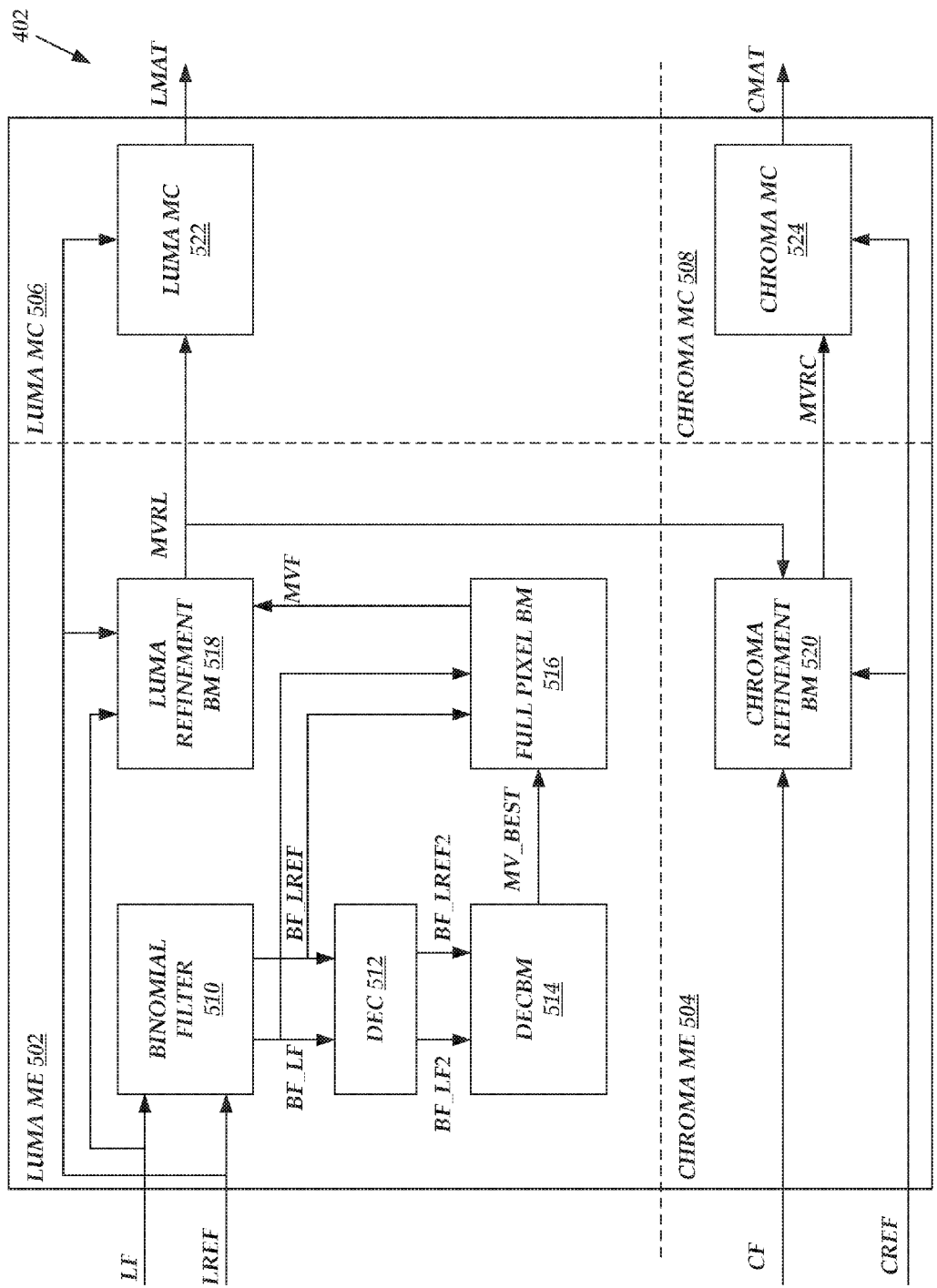
FIG. 5 is a block diagram that illustrates one example embodiment of a frame matching module of a frame alignment module.

One example embodiment of a frame match module, such as frame match module 402, is illustrated in FIG. 5. It should be understood that the discussion and configuration of frame match module 402 similarly applies to frame match modules 408 and 414, though not necessarily limited to identical configurations. Frame match module 402 comprises motion estimation (ME) and motion compensation (MC) functionality (also referred to herein as motion estimation logic and motion compensation logic, respectively), which is further subdivided into luma ME 502 (also luma ME logic or the like), chroma ME 504 (also chroma ME logic or the like), luma MC 506 (also luma MC logic or the like), and chroma MC 508 (also chroma MC logic or the like). In one embodiment, the luma ME 502 comprises a binomial filter 510 (also referred to herein as a pixel filter logic), a decimator 512 (also referred to herein as decimator logic), a decimated block matching (DECBM) module 514 (also referred to herein as decimated block matching logic), a full pixel bock matching (BM) module 516 (also referred to herein as full pixel block matching logic), and a luma refinement BM module 518. The chroma ME 504 comprises a chroma refinement BM module 520. The luma MC 506 comprises a luma MC module 522, and the chroma MC 508 comprises a chroma MC module 524.

The frame matching module 402 takes as input two video frames, each of which includes luminance and chrominance data in either of the well known CCIR-601 4:2:0 or 4:2:2 formats, though not limited to these formats, and in some embodiments may receive a proprietary format among other types of formats. For 4:2:0 formats, the chrominance includes two channels subsampled by a factor of two (2) in both the vertical and horizontal directions. For 4:2:2 formats, the chrominance is subsampled in only the horizontal direction. The luminance inputs are denoted in FIG. 5 as LREF and LF, which represent the reference frame luminance and a frame luminance to match to the reference, respectively. Similarly, the corresponding chrominance inputs are denoted as CREF (reference) and CF (frame to match to the reference). The output of the frame match process is a frame which includes luminance (LMAT) data and chrominance (CMAT) data. For instance, according to the embodiments described in association with, and illustrated in, FIGS. 2C, 3A, and 5, LREF, CREF, LF, CF and LMAT, CMAT correspond to the sets of frames given in Table 1 below:

TABLE 1

Sets of Frames Undergoing Frame Matching

| LREF, CREF | LF, CF | LMAT, CMAT | Description |
|---|---|---|---|
| F6(t) | F7(t) | M76(t) | Frame Match F7(t) to F6(t) M76(t) is an estimate of F6(t) from F7(t) |
| F4(t) | FSUM67(t) | MSUM67(t) | Frame Match FSUM67(t) to F4(t) |

TABLE 1-continued

Sets of Frames Undergoing Frame Matching

| LREF, CREF | LF, CF | LMAT, CMAT | Description |
|---|---|---|---|
| F4(t) | FSUM0123(t) | MSUM0123(t) | NormalizeFSUM67(t) with divide by 2 prior to Frame Match. MSUM67(t) is an estimate of F4(t) from both F6(t) and F7(t) Frame Match FSUM0123(t) to F4(t) Normalize FSUM(t-4) with divide by 4 prior to Frame Match. MSUM0123(t) is an estimate of F4(t) from F0(t), F1(t), F2(t), F3(t) (or equivalently, F4(t-4), F5(t-4), F6(t-4), F7(t-4)) |

In general, one approach taken by the frame match module 402 is to perform block matching on blocks of pixels (e.g., 8×8) in the luminance channel, and to export the motion vectors from the block matching of the luminance channel for re-use in the chrominance channels. In one embodiment, the reference image LREF is partitioned into a set of 8×8 non-overlapping blocks. The final result of frame-matching is a set of motion vectors into the non-reference frame, LF, for each 8×8 block of LREF to be matched. Each motion vector represents the 8×8 block of pixels in LF which most closely match a given 8×8 block of LREF. The luminance pixels are filtered with a binomial filter and decimated prior to block matching.

The luma ME 502 comprises logic to provide the filtering out of noise, coarse block matching (using a multi-level or multi-stage hierarchical approach that reduces computational complexity) of the filtered blocks, and refined block matching using undecimated pixel blocks and a final motion vector derived from candidates of the coarse block matching process and applied to unfiltered pixels of the inputted frames. Explaining in further detail and with reference to FIG. 5, the luminance input (LREF, LF) is received at binomial filter 510, luma refinement BM module 518, and luma MC module 522. The binomial filter 510 processes the data and produces full-pixel luminance (BF_LF, BF_LREF), each of the luminance images of size $N_{ver} \times N_{hor}$. The binomial filter 510 performs a 2D convolution of each input frame according to the following equation:

$$BF\_X(i, j) = \sum_{m=-1}^{1} \sum_{n=-1}^{1} x(m, n) G(i - m, j - n), \quad \text{Eq. (2)}$$

where $x(0: N_{ver}-1, 0: N_{hor}-1)$ is an input image of size $N_{ver} \times N_{hor}$, BF_X(i,j) is the binomial filtered output image, and G(m,n) is the 2D convolution kernel given by the following equation:

$$G(i, j) = \frac{1}{16} \begin{pmatrix} 1 & 2 & 1 \\ 2 & 4 & 2 \\ 1 & 2 & 1 \end{pmatrix} \quad \text{Eq. (3)}$$

Accordingly, LF and LREF are both binomial filtered according to Eq. (3) to produce BF_LF and BF_LREF, respectively, which are also input to the decimator 512 and the full BM module 516. Although a binomial filter is described as one example pixel filter, in some embodiments, other types of filters may be employed.

BF_LF and BF_LREF are received at decimator 512, which performs, in one embodiment, a decimation by two (2) function in both the vertical and horizontal dimensions to produce BF_LF2 and BF_LREF2, respectively. The output of the decimator 512 comprises filtered, decimated luminance data (BF_LF2, BF_LREF2), where each of the luminance images are of size $N_{ver}/2 \times N_{hor}/2$. Thus, if the size of LF and LREF are both $N_{ver} \times N_{hor}$ pixels, then the size of BF_LF2 and BF_LREF2 are $N_{ver}/2 \times N_{hor}/2$ pixels. In some embodiments, other factors or functions of decimation may be used, or none at all in some embodiments.

The decimated, binomial-filtered luma pixels, BF_LF2 and BF_LREF2, are input to the DECBM module 514, which performs decimated block matching on the filtered, decimated data (BF_LF2, BF_LREF2). In one embodiment, the DECBM module 514 applies 4×4 block matching to the 4×4 blocks of BF_LREF2 to correspond to the 8×8 blocks of BF_LREF. In other words, the 4×4 pixel blocks in the decimated domain correspond to 8×8 blocks in the undecimated domain. The DECBM module 514 partitions BF_LREF2 into a set of 4×4 blocks given by the following equation:

$$BREF2(i, j) = BF\_LREF2(4i:4i+3, 4j:4j+3), \quad \text{Eq. (4)}$$

where $$i = 0, 1, \ldots \frac{N_{hor}-1}{4} \text{ and } j = 0, 1, \ldots \frac{N_{ver}-1}{4}.$$

It is assumed that BF_LREF2 is divisible by four (4) in both the vertical and horizontal dimensions. The set of 4×4 blocks BREF2(i,j) in Eq. (4) includes all pixels of BF_LREF2 partitioned as non-overlapping 4×4 blocks. A function of the DECBM module 514 is to match each of these blocks to the most similar blocks in BF_LF2.

For each of the 4×4 blocks at BREF2(i,j), the DECBM module 514 searches, in one example embodiment, over a ±24 horizontal by ±12 vertical search area of BF_LF2 (for a total 49×25 decimated pixel area) to find 4×4 pixel blocks which most closely match the current 4×4 block. In some embodiments, differently configured (e.g., other than 24×12) search areas are contemplated. The search area of BF_LF2 is co-located with the block BREF2(i,j) to be matched. In other words, the search region BF_LF2_SEARCH(i, j) may be defined by the following equation:

$$BF\_LF2\_SEARCH(i,j) = BF\_LF2(4i:4i\pm12, 4j:4j\pm24) \quad \text{Eq. (5)}$$

Eq. (5) defines the search region as a function of (i j) that is centered at the co-located block BF_LF2(4i,4j) as in BF_LREF2(4i,4j), or equivalently BREF2(i,j). The search region may be truncated for blocks near the borders of the frame where a negative or positive offset does not exist. Any 4×4 block at any pixel position in BF_LF2_SEARCH(i,j) is a candidate match. Therefore, the entire search area is traversed extracting 4×4 blocks, testing the match, then moving one (1) pixel horizontally or one (1) pixel vertically.

One matching criterion, among others in some embodiments, is defined as a 4×4 Sum-Absolute Difference (SAD) between the candidate block in BF_LF2 search area and the current BREF2 block to be matched according to Eq. 6 below:

$$SAD4 \times 4(y, x) = \sum_{u=0}^{3} \sum_{v=0}^{3} |BF\_LF2(4i+y+u, 4j+x+v) - BREF2(i+u, j+v)| \quad \text{Eq. (6)}$$

where $-24 \leq x \leq 24$, $-12 \leq y \leq 12$. The values of y and x which minimize the SAD 4×4 function in Eq. (6) define the best matching block in BF_LF2. The offset in pixels from the current BREF2 block in the vertical (y) and horizontal (x) directions defines a motion vector to the best matching block. If a motion vector is denoted by mv, then mv.y denotes the motion vector vertical direction, and mv.x denotes the horizontal direction. Throughout the present disclosure, reference is made to SAD and SAD computations for distance or difference measures.

In one embodiment, the DECBM module 514 may store not only the best motion vector, but a set of candidate motion vectors up to N_BEST_DECBM_MATCHES, where N_BEST_DECBM_MATCHES is a parameter having an integer value greater than or equal to one. For example, in one implementation, N_BEST_DECBM_MATCHES=3. As the DECBM module 514 traverses the search area, computing SAD 4×4 according to Eq. (6), the DECBM module 514 keeps track of the N_BEST_DECBM_MATCHES (e.g., minimum SAD 4×4 blocks) by storing the motion vectors (x and y values) associated with those blocks and the SAD 4×4 value. In one embodiment, a block is only included in the N_BEST_DECBM_MATCHES if its distance in either of the horizontal or vertical directions is greater than one (1) from any other saved motion vectors. The output of the DECBM module 514 is a set of motion vectors (MV_BEST) corresponding to N_BEST_DECBM_MATCHES, the motion vectors input to the full pixel BM module 516. In some embodiments, in addition to MV_BEST, the DECBM module 514 adds one or more of the following two motion vector candidates, if they are not already in the MV_BEST set: a zero motion vector and/or a motion vector of a neighboring block (e.g., a block located one row above). For example, if N_BEST_DECBM_MATCHES=3, meaning three (3) candidate motion vectors come from the DECBM module 514, then the total candidate motion vectors is five (5) (three (3) from the DECBM module SAD 4×4 operation plus a zero motion vector plus a neighboring motion vector). Therefore, in this example, if N_BEST_DECBM_MATCHES=3, then the total candidate motion vectors is five (5).

The DECBM module 514 omits from a search the zero vector (mv.x=0, mv.y=0) as a candidate motion vector output and any motion vectors within one pixel of the zero vector since, in one embodiment, the zero vector is always input to the next stage processing in addition to the candidate motion vectors from the DECBM module 514. Therefore, if N_BEST_DECBM_MATCHES=3, then the three (3) motion vectors consist of non-zero motion vectors, since any zero motion vectors are omitted from the search. Any zero-motion vector is included as one of the added motion vectors of the output of the DECBM module 514. In some embodiments, zero vectors are not input to the next stage and/or are not omitted from the search.

The full pixel BM module 516 receives the set of candidate motion vectors, MV_BEST, and performs a limited, full pixel block matching using the filtered, undecimated frames (BF_LF, BF_LREF). In other words, the full pixel BM module 516 takes as input the motion vectors obtained in the DECBM module-implemented process, in addition to the zero motion vector and the motion vector from a neighboring block as explained above, and chooses a single refined motion vector from the candidate set. In some embodiments, a neighboring motion vector is not included as a candidate.

Operation of an embodiment of the full pixel BM module 516 is described as follows. The full pixel BM module 516 partitions BF_LREF into 8×8 blocks corresponding to the 4×4 blocks in BF_REF2 as follows:

$$BREF(i,j) = BF\_LREF(8i:8i+7, 8j:8j+7), \quad \text{Eq. (7)}$$

where $$i = 0, 1, \ldots \frac{N_{hor} - 1}{8},$$

and $$j = 0, 1, \ldots \frac{N_{ver} - 1}{8}.$$

BREF is a set of non-overlapping 8×8 blocks comprising the entire luminance frame BF_LREF with a direct correspondence to the BREF2 4×4 blocks. The full pixel BM module 516 receives the MV_BEST motion vectors from the DECBM module 514 and the full pixel (undecimated), binomial filtered luminance BF_LREF and BF_LF.

The input, MV_BEST, to the full pixel BM module 516, may be denoted according to the following set: MV_BEST={mv_best(0), mv_best(1), . . . mv_best (N_BEST_DECBM_MATCHES-1)}. The full pixel BM module 516 scales the input motion vectors to full pixel by multiplying the x and y coordinates by two (2), according to Eq. (8) as follows:

$$mvfull(k).x = 2 \times mv\_best(k).x \quad 0 \leq k \leq N\_BEST\_DECBM\_MATCHES,$$

$$mvfull(k).y = 2 \times mv\_best(k).y \quad 0 \leq k < N\_BEST\_DECBM\_MATCHES \quad \text{Eq. (8)}$$

where $0 \leq k \leq N\_BEST\_DECBM\_MATCHES-1$. Note that the zero motion vector and neighboring block motion vector do not need scaling since zero does not need scaling, and the neighboring block motion vector is already scaled (sourced from the full pixel BM module 516). After scaling to full pixel, the full pixel BM module 516 determines a refined motion vector, mvrfull(k), from its corresponding candidate motion vector, mvfull(k), by computing a minimum SAD for 8×8 full-pixel blocks in a 5×5 refinement search around the scaled motion vector according to Eq. (9):

$$SAD8 \times 8(i, j, mvfull(k) \cdot y + m, mvfull(k) \cdot x + n) = \quad \text{Eq. (9)}$$
$$\sum_{u=0}^{7} \sum_{v=0}^{7} |BF\_LF(8i + mvfull(k) \cdot y + n + u,$$
$$8j + mvfull(k) \cdot x + m + v) - BREF(i + u, j + v)|$$

where $-2 \leq m \leq 2$, $-2 \leq n \leq 2$. The context of the present disclosure is that refinement search ranges other than 5×5 are possible and hence contemplated for some embodiments. Minimizing Eq. (9) for each motion vector of the candidate set results in (N_BEST_DECBM_MATCHES+2) refined candidate motion vectors, mvrfull(k), where $0 \leq k <$ (N_BEST_DECBM_MATCHES+2). The full pixel BM module 516 selects a final winning motion vector from the refined motion vectors by comparing the SAD of the refined motion vectors according to the following equation:

$$[kf] = \text{Min}_k \{\lambda * MVDIST(k) + DISTBIAS(k) + SAD8x8(i, j, mvrfull(k) \cdot y, mvrfull(k) \cdot x)\} \quad \text{Eq. (10)}$$

where:
kf=index of refined motion vector that is the winner;
MVDIST(k)=min(dist(mvrfull(k), 0), dist(mvrfull(k), mvfull(B)));
mvrfull(B)=winning motion vector of neighboring block;
dist(a,b)=distance between motion vectors a and b;
min(x,y)=minimum of x and y;
DISTBIAS(k)=0 for MVDIST(k)<12, 20 for MVDIST(k) <20, 40 otherwise
□□□=operational parameter, e.g., □□□=4
In other words, the larger the motion vector, the lower the SAD value to justify the larger motion vector as a winning candidate. For instance, winners comprising only marginally lower SAD values likely results in random motion vectors. The 12, 20, 40 values described above forces an increased justification (lower SAD values) for increasingly larger motion vectors. In some embodiments, other values and/or other relative differences between these values may be used (e.g., 1, 2, 3 or 0, 10, 20, etc.). Therefore, the final motion vector result from the full pixel block mode operation of full pixel BM module 516 is given by:

$$mvf(i,j).x = mvrfull(kf).x$$

$$mvf(i,j).y = mvrfull(kf).y \quad \text{Eq. (11)}$$

If the SAD value in Eq. (9) corresponding to the best motion vector of Eq. (11) is above a threshold, T_SAD, the block is flagged as a bad block (e.g., BAD_MC_BLOCK) so that instead of copying the block indicated by the motion vector in the search frame, the motion compensation process (described below) copies the original block of the reference frame instead.

The resultant output of the full pixel BM module 516 comprises a single final motion vector, MVF, for each non-overlapping block, which is input to the luma refinement BM module 518. The luma refinement BM module 518 (like the full pixel BM module 516) uses 8×8 block matching since it receives as input full (non-decimated) images. That is, the luma refinement BM module 518 refines the motion vectors using original unfiltered frame data (LREF, LF), or more specifically, takes as input the set of motion vectors MVF obtained in the full pixel BM module 516 and refines the motion vectors using original unfiltered pixels. Explaining further, the luma refinement BM module 518 partitions the original noisy LREF into 8×8 non-overlapping blocks corresponding to the 8×8 blocks in BF_REF according to the following equation:

$$REF(i,j) = LREF(8i:8i+7, 8j:8j+7), \quad \text{Eq. (12)}$$

where $$i = 0, 1, \ldots \frac{N_{hor} - 1}{8},$$

and $$j = 0, 1, \ldots \frac{N_{ver} - 1}{8}.$$

REF is a set of non-overlapping 8×8 blocks comprising the entire luminance frame LREF with a direct correspondence to the BREF 8×8 blocks. For each block to be matched in REF, there is a motion vector from full pixel block mode operation of full pixel BM module 516 (e.g., mvf(i,j)). In one embodiment, a 1-pixel refinement around mvf(i,j) proceeds by the m and n which minimizes the following equation:

$$SAD8 \times 8(i, j, mvf(i, j) \cdot y + m, mvf(i, j) \cdot x + n) = \quad \text{Eq. (13)}$$

$$\sum_{u=0}^{7} \sum_{v=0}^{7} |LF(8i + mvf(i, j) \cdot y + n + u,$$

$$8j + mvf(i, j) \cdot x + m + v) - REF(i + u, j + v)|$$

where −1≤m≤−1, −1≤n≤−1. In some embodiments, pixel refinement other than by one (1-pixel) may be used in some embodiments, or omitted in some embodiments. The refined motion vector for the block at position i,j is given by the values of m and n, mref and nref respectively, which minimize Eq. (13). The refined motion vector is given by Eq. (14) as follows:

$$mvr(i,j).x = mvf(i,j).x + mref \quad mvr(i,j).x = mvf(i,j).x + mref$$

$$mvr(i,j).y = mvf(i,j).x + nref \quad mvr(i,j).y = mvf(i,j).x + nref \quad \text{Eq. (14)}$$

where $$i = 0, 1, \ldots \frac{N_{hor} - 1}{8},$$

and $$j = 0, 1, \ldots \frac{N_{ver} - 1}{8}.$$

MVRL (also referred to herein as refined motion vector(s)) denotes the complete set of refined motion vectors mvr(i,j) (e.g., for i=0, 8, 16, ... $N_{ver}$−7; j=0, 8, 16, ... $N_{Hor}$−7) for the luminance channel output from the luma refinement BM module 518. In other words, MVRL denotes the set of motion vectors representing every non-overlapping 8×8 block of the entire frame.

MVRL is used by the luma MC module 522 and the chroma refinement BM module 520. Referring to the chroma refinement BM module 520, the refined motion vectors, MVRL, are received at the chroma refinement BM module 520, which performs a refined block matching in the chrominance channel based on inputs CF and CREF. For 4:2:0 video formats, when the chroma is sub-sampled by a factor of two (2) in each of the horizontal and vertical dimensions, the chroma refinement BM module 520 performs 4×4 full-pixel block matching. That is, the chroma (both Cb and Cr) 4×4 blocks correspond directly to the luma 8×8 blocks. Using the MVRL input, the chroma refinement BM module 520, for both Cb and Cr chroma frames, performs a 1-pixel refinement around the MVRL input motion vectors in a similar manner to the process performed by the luma refinement BM module 518 described above, but using 4×4 blocks instead of 8×8, and a SAD 4×4 instead of SAD 8×8 matching criterion. The resulting set of motion vectors are MVRCb for Cb and MVRCr for Cr (collectively shown as MVRC in FIG. 5), which are input to the chroma MC module 524 to perform motion compensation.

Motion compensation is a well-known method in video processing to produce an estimate of one frame from another (i.e., to "match" one frame to another). MVRL and MVRC are input to motion compensation (MC) processes performed at luma MC module 522 and chroma MC module 524, respectively, which import the blocks indicated by the MVRL and MVRC motion vectors. With reference to the luma MC module 522, after the block matching has been accomplished as described hereinabove, the LF frame is frame-matched to LREF by copying the blocks in LF indicated by the motion vectors MVRL. For each block, if the block has been flagged as a BAD_MC_BLOCK by the full pixel BM module 516, instead of copying a block from the LF frame, the reference block in LREF is copied instead. For chroma operations, the same process is carried out in chroma MC module 508 on 4×4 blocks using MVRCb for Cb and MVRCr for Cr, and hence discussion of the same is omitted for brevity. While 8×8 and 4×4 are described above for the various block sizes, other block sizes may be used.

With reference to FIG. 3, having described an example embodiment of the various modules or logic that comprise the frame alignment module 310 for the VDN system embodiment 200c-1, attention is directed to the overlapped block processing module 350. In general, after frame matching, the overlapped block processing module 350 denoises the overlapped 3D blocks and accumulates the results, as explained in association with FIGS. 2A-2C. In one embodiment, looping occurs by stepping j by a step size s in pixels (e.g., s=2). The overlapped block processing moves horizontally until j==$N_{Hor}$-1, after which j is set to 0 and i is incremented by s. Note that in some embodiments, seven (7) pixels are added around the border of the frame to enable the border pixels to include all blocks. For simplicity, these pixels may be a DC value equal to the touching border pixel.

Referring again to FIG. 3, the overlapped block processing module 350 receives the matched frames M4(t), M5(t), MSUM67(t), and MSUM0123(t), and extracts co-located blocks of 8×8 pixels from these four (4) frames. Denote the four (4) blocks extracted at a particular i,j pixel position in the four (4) frames as b(i,j,t) with t=0 . . . 3, then after reordering of the blocks (as explained below in the context of the 1D transform illustrated in FIGS. 6A-6D), the following terminology is described:

b(i,j,0) is an 8×8 block from MSUM0123(t) at pixel position i,j
b(i,j,1) is an 8×8 block from M4(t) at pixel position i,j
b(i,j,2) is an 8×8 block from M5(t) at pixel position i,j
b(i,j,3) is an 8×8 block from MSUM67(t) at pixel position i,j Starting with i=0 and j=0, the upper left corner of the frames, a 2D transform module 304 (also referred to herein as transform logic) extracts the four (4) blocks b(0,0,0:3) and performs a 2D transform. That is, the 2D transform is taken on each of the four (4) temporal blocks b(i,j,t) with 0≤t≤3, where i,j is the pixel position of the top left corner of the 8×8 blocks in the overlapped block processing. In some embodiments, a 2D-DCT, DWT, among other well-known transforms may be used as the spatial transform. In an embodiment described below, the 2D transform is based on an integer DCT defined in the Advanced Video Coding (AVC) standard (e.g., an 8×8 AVC-DCT), which has the following form:

$$H(X)=DCT(X)=C \cdot X \cdot C^T \qquad \text{Eq. (15)}$$

where, $$C = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -3 \end{bmatrix} \cdot \frac{1}{8}$$

X is an 8×8 pixel block, and the products on the right are matrix multiplies. One method for computing the DCT employs the use of signed powers of two for computing the multiplication products. In this way no hardware multipliers are needed; but rather, the products are created by shifts and additions thereby reducing the overall logic. In some embodiments, hardware multipliers may be used. In addition, scaling factors may be used, which may also reduce the required logic. To retrieve the original pixels (X), the integer matrix is scaled such that the inverse DCT implemented by the inverse 2D transform module 314 yields the original values of X. One form of the inverse AVC-DCT of the inverse transform module 314 comprises the following:

$$X=(C^T \cdot H(X) \cdot C) \otimes S_{i,j} \qquad \text{Eq. (16)}$$

or by substitution:

$$X=C_s^T \cdot H(X) \cdot C_s, \qquad \text{Eq. (17)}$$

where $C_s = C \otimes S_{i,j}$ and the symbol $\otimes$ denotes element by element multiplication. One example of scaling factors that may be used is given below:

$$S_{i,j} = \frac{1}{\sum_{i,j=0}^{7} C_{(i,j)}^2} = \begin{matrix} 0.0020 \\ 0.0017 \\ 0.0031 \\ 0.0017 \\ 0.0020 \\ 0.0017 \\ 0.0031 \\ 0.0017 \end{matrix} \qquad \text{Eq. (18)}$$

After the 2D transform, the overlapped block processing module 350 changes the spatial dimension from 2D to 1D by zig-zag scanning the output of each 2D transform from low frequency to highest frequency, so the 2D transformed block bs(i,j,f) becomes instead bs(zz_index, f), where 0≤zz_index≤63, 0≤f≤3. The mapping of (i,j) to zz_index is given by the zig_zag_scan vector below, identical to the scan used in MPEG-2 video encoding. In some embodiments, the 2D dimension may be retained for further processing. If the first row of the 2D matrix is given by elements 0 through 7, the second row by 8 through 16, then zig_zag_scan[0:63] specifies a 2D to 1D mapping as follows:

zig_zag_scan[0:63]=
{
0,1,8,16,9,2,3,10,17,24,32,25,18,11,4,5, 12,19,26,33,40,48,41,34,27,20,13,6,7,14,21,28,
35,42,49,56,57,50,43,36,29,22,15,23,30,37,44,51,
58,59,52,45,38,31,39,46,53,60,61,54,47,55,62,63
};

At a time corresponding to computation of the 2D transform (e.g., subsequent to the computation), the temporal mode (TemporalMode) is selected by temporal mode module 302 (also referred to herein as temporal mode logic). When utilizing a Haar 1-D transform, the TemporalMode defines whether 2D or 3D thresholding is enabled, which Haar subbands are thresholded for 3D thresholding, and which spatial subbands are thresholded for 2D thresholding. The temporal mode may either be SPATIAL_ONLY, FWD4, BAK4, or MODE8, as further described herein below. The temporal mode is signaled to the 2D threshold module 306 and/or the 3D threshold module 310 (herein also collectively or individually referred to as threshold logic or thresholding logic). If the TemporalMode==SPATIAL_ONLY, then the 2D transformed block bs(zz_index, 1) is thresholded yielding bst(zz_index, 1). If the temporal mode is not SPATIAL_ONLY, then bst(zz_index,t) is set to bs(zz_index, f).

Following spatial thresholding by the 2D threshold module 306, the bst(zz_index, t) blocks are 1D transformed at the 1D transform module 308 (also referred to herein as transform logic), yielding bhaar(zz_index, f). The 1D transform module 308 takes in samples from the 2D transformed 8×8 blocks that have been remapped by zig-zag scanning the 2D blocks to 1D, so that bs(zz_index,f) represents a sample at 0≤zz_index≤63 and 0≤f≤3 so that the complete set of samples is bs(0:63, 0:3). Whereas the 2D transform module 304 operates on spatial blocks of pixels from the matched frames, the 1D transform module 308 operates on the temporal samples across the 2D transformed frame blocks at a given spatial index 0≤zz_index≤63. Therefore, there are sixty-four (64) 1D transforms for each set of four (4) 8×8 blocks.

As indicated above, the 1D Transform used for the VDN system embodiment 200c-1 is a modified three-level, 1D Haar transform, though not limited to a Haar-based transform or three levels. That is, in some embodiments, other 1D transforms using other levels, wavelet-based or otherwise, may be used, including DCT, WHT, DWT, etc., with one of the goals comprising configuring the samples into filterable frequency bands. Before proceeding with processing of the overlapped block processing module 350, and in particular, 1D transformation, attention is re-directed to FIGS. 6A-6D, which illustrates various steps in the modification of a 1D Haar transform in the context of the reduction in frame matching described in association with FIGS. 2A-2C. It should be understood that each filter in the evolution of the 1D Haar shown in respective FIGS. 6A-6D may be a stand-alone filter that can be used in some VDN system embodiments. A modified Haar wavelet transform is implemented by the 1D transform module 308 (and the inverse in inverse 1D transform module 312) for the temporal dimension that enables frame collapsing in the manner described above for the different embodiments. In general, a Haar wavelet transform in one dimension transforms a 2-element vector according to the following equation:

$$\begin{pmatrix} y(1) \\ y(2) \end{pmatrix} = T \cdot \begin{pmatrix} x(1) \\ x(2) \end{pmatrix},$$ Eq. (19)

where $$T = \frac{1}{\sqrt{2}} \begin{pmatrix} 1 & 1 \\ 1 & -1 \end{pmatrix}.$$

From Eq. (19), it is observed that the Haar transform is a sum-difference transform. That is, two elements are transformed by taking their sum and difference, where the term $1/\sqrt{2}$ is energy preserving, or normalization. It is standard in wavelet decomposition to perform a so-called "critically sampled full dyadic decomposition."

Figure 6A:
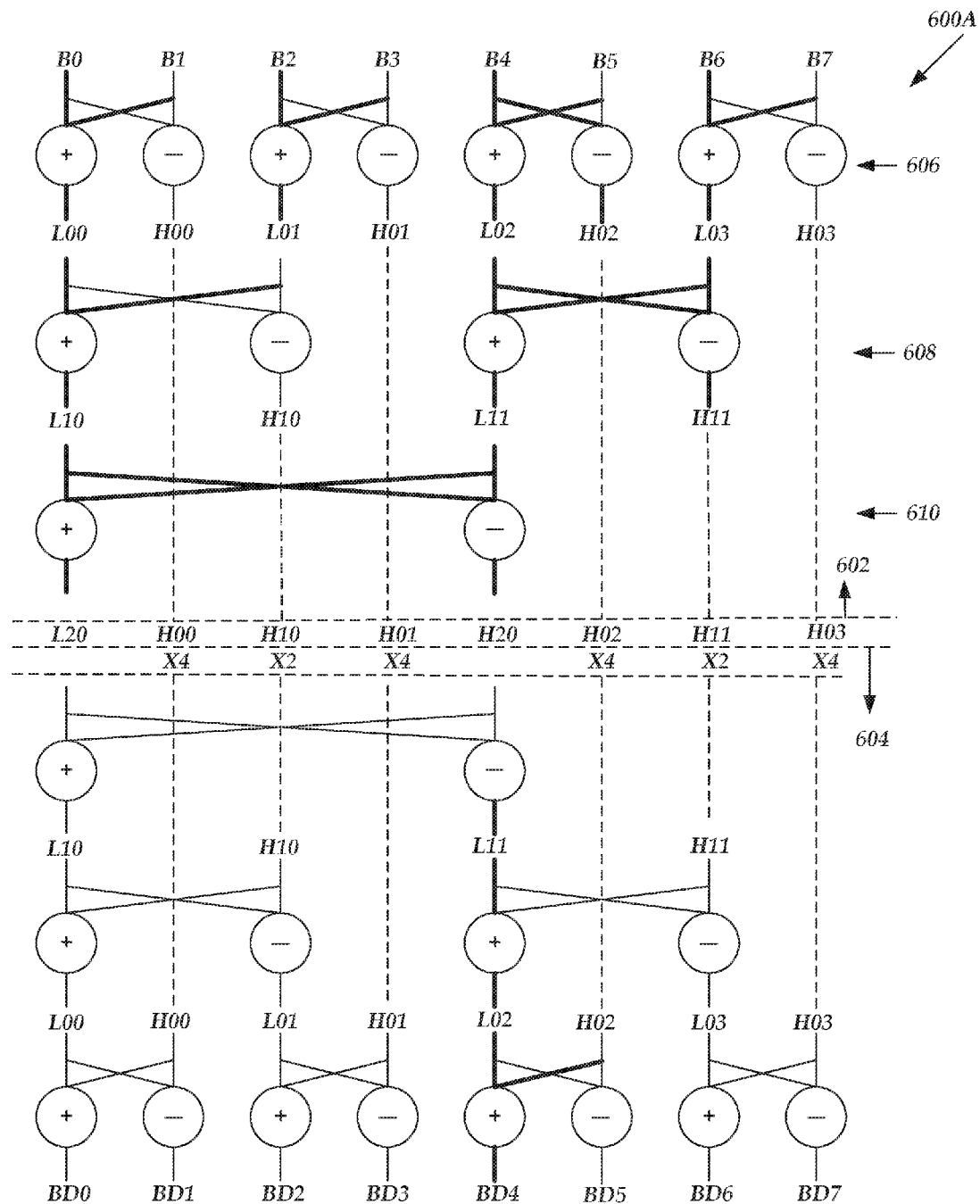
FIGS. 6A-6D are block diagrams that illustrate a modified one-dimensional (1D) transform used in an overlapped block processing module, the 1D transform illustrated with progressively reduced complexity.

A signal flow diagram 600a for the Haar transform, including the forward and inverse transforms, is shown in FIG. 6A. The signal flow diagrams 600a, 600b, 600c, or 600d in FIGS. 6A-6D are illustrative of example processing (from top-down) of 2D transform samples that may be implemented collectively by the 1D transform module 308 and the inverse 1D transform module 312. The signal flow diagram 600a is divided into a forward transform 602 and an inverse transform 604. The normalizing term $1/\sqrt{2}$ may be removed if the transform is rescaled on inverse (e.g., as shown in FIGS. 6A-6D by factors of four (4) and two (2) with ×2 and ×4, respectively, in the inverse transform section 604). In addition, while FIG. 6A shows the inverse Haar transform 604 following directly after the forward transform 602, it should be appreciated in the context of the present disclosure that in view of the denoising methods described herein, thresholding operations (not shown) may intervene in some embodiments between the forward transform 602 and the inverse transform 604.

In a dyadic wavelet decomposition, a set of samples are "run" through the transformation (e.g., as given by Eq. (19)), and the result is subsampled by a factor of two (2), known in wavelet theory as being "critically sampled." Using 8-samples (e.g., 2D transformed, co-located samples) as an example in FIG. 6A, the samples b0 through b7 are transformed in a first stage 606 by Eq. (19) pair-wise on [b0 b1], [b2 b3], . . . [b6 . . . b7], producing the four (4), low frequency, sum-subband samples [L00, L01, L02, L03] and four (4), high frequency, difference-subband samples [H00, H01, H02, H03]. Since half the subbands are low-frequency, and half are high-frequency, the result is what is referred to as a dyadic decomposition.

An 8-sample full decomposition continues by taking the four (4), low-frequency subband samples [L00, L01, L02, L03] and running them through a second stage 608 of the Eq. (19) transformation with critical sampling, producing two (2) lower-frequency subbands [L10, L11] and two (2) higher frequency subbands [H10, H11]. A third stage 610 on the two (2) lowest frequency samples completes the full dyadic decomposition, and produces [L20, H20].

The 1D Haar transform in FIG. 6A enables a forward transformation 602 and inverse transformation 604 when all samples (e.g., bd(i,j,0:7)) are retained on output. This is the case for a 3D accumulation buffer. However, as discussed hereinabove, the output of the 2D+1 accumulation buffer (see FIGS. 2A-2B) requires only bd(i,j,4) and bd(i,j,7). Therefore, simplification of the flow diagram of 600a, where only the bd(i,j,4) and bd(i,j,7) are retained, results in the flow diagram denoted as 600b and illustrated in FIG. 6B.

Figure 6B:
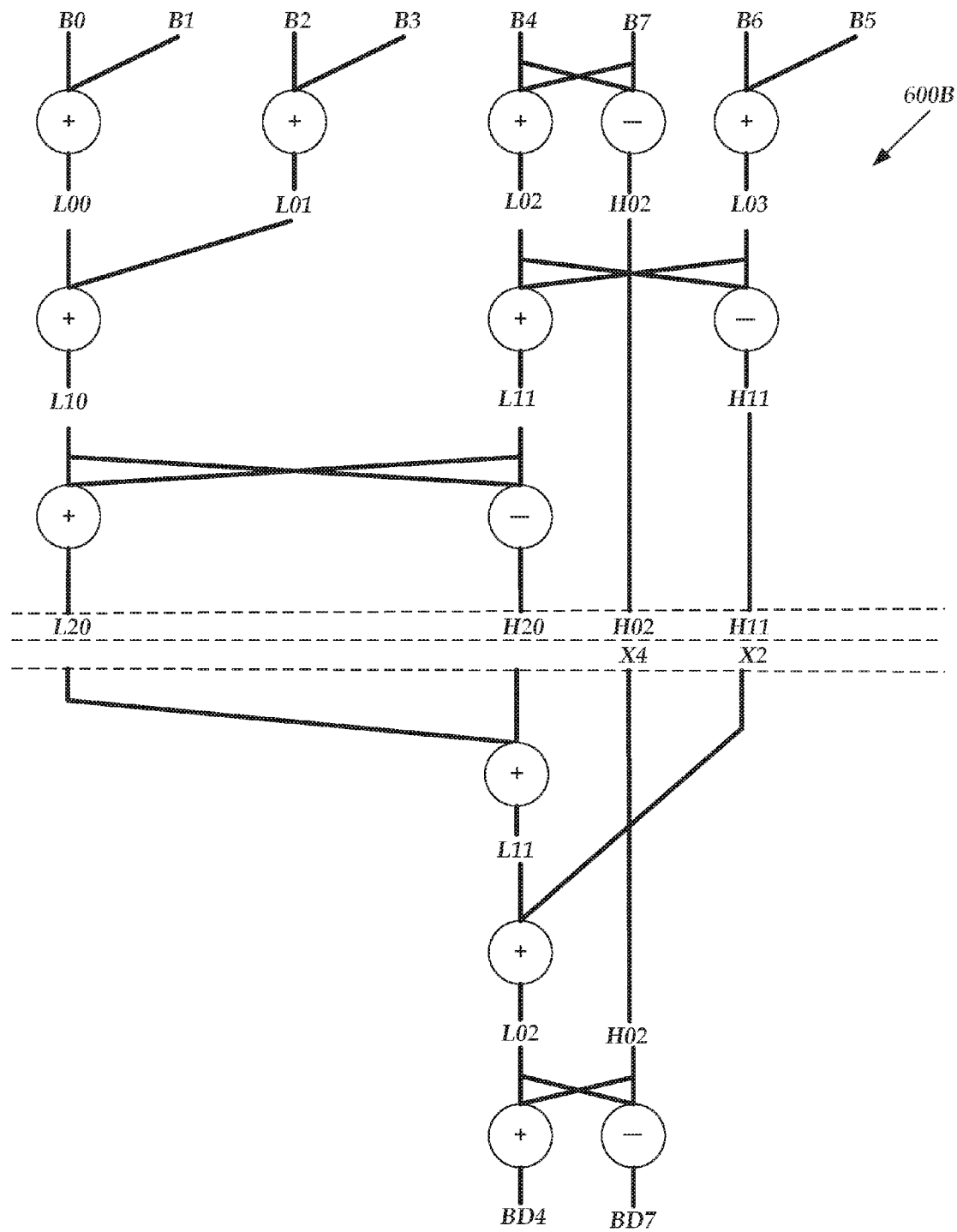

In FIG. 6B, since bd(i,j,4) and bd(i,j,7) are the desired outcome, the entire left-hand side of the transformation process requires only the summation of the first four (4) samples b(i,j,0:3). As described below, this summation may occur outside the 1D transform (e.g., as part of the frame matching process). On the right side, there has been a re-ordering of the samples when compared to the flow diagram of FIG. 6A (i.e., [b4 b5 b6 b7] to [b4 b7 b6 b5]). In addition, only the sum of b(i,j,5) and b(i,j,6) is required (not a subtraction). Accordingly, by using this simplified transform in flow diagram 600b, with sample reordering, and frame-matching the sum of the first four (4) frames to the reference frame F4(t), the first four (4) frames may be collapsed into a single frame. For frames 5 and 6, an assumption is made that both frames have been frame matched to the reference producing M5(t) and M6(t), and hence those frames may be summed prior to (e.g., outside) the 1D transform.

Figure 6C:
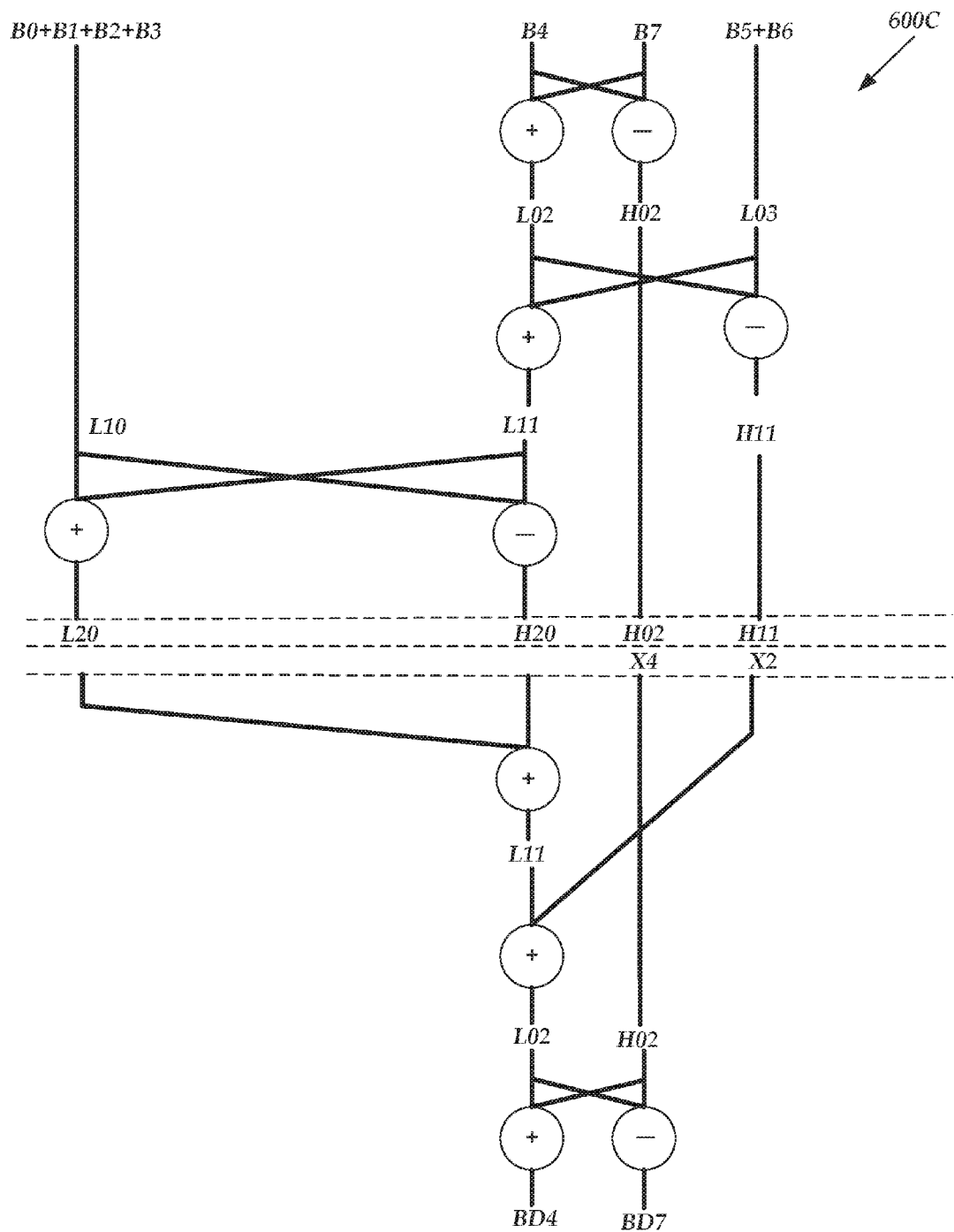

When the summing happens outside the 1D transform, the resulting 1D transform is further simplified as shown in the flow diagram 600c of FIG. 6C, where b0+b1+b2+b3 represents the blocks from the frame-matched sum of frames F0(t) through F3(t), that is MSUM0123(t), prior to the 1D transform, and b5+b6 represents the sum of blocks b(i,j,5) and b(i,j,6) from frame-matched and summed frames M5(t) and M6(t), that is MSUM56(t), the summation implemented prior to the 1D transform. Note that for 2D+1 accumulation embodiments corresponding to Haar modifications corresponding to FIGS. 6B and 6C, there is a re-ordering of samples such that b7 is swapped in and b5 and b6 are moved over.

Figure 6D:
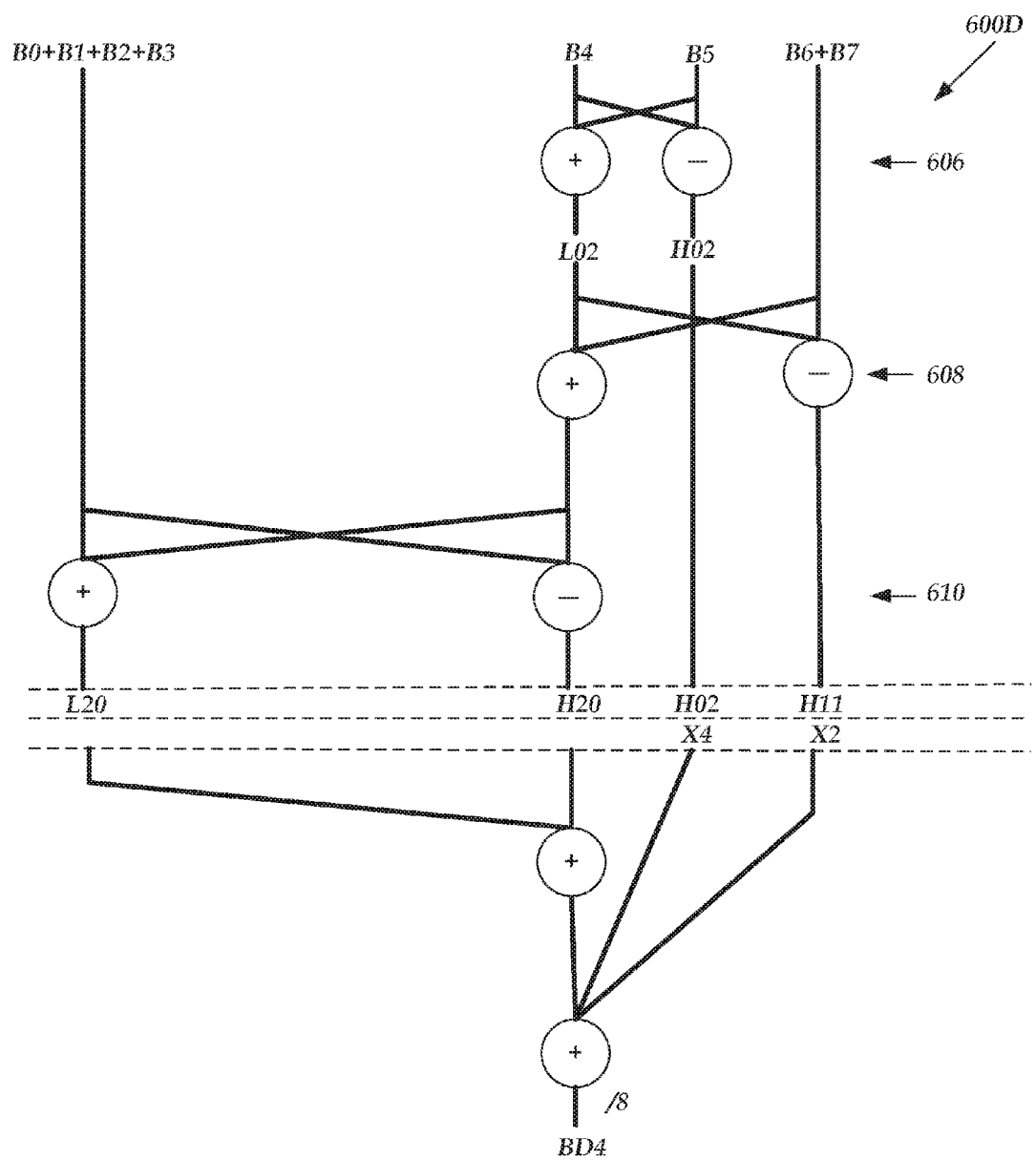

Referring to FIG. 6D, shown is a flow diagram 600d that is further simplified based on a 2D accumulation buffer, as shown in FIG. 2C. That is, only one input sample, bd4, has been retained on output to the 2D accumulation buffer. Note that in contrast to the 2D+1 accumulation buffer embodiments where sample re-ordering is implemented as explained above, the Haar modifications corresponding to FIG. 6D involve no sample re-ordering.

Continuing now with the description pertaining to 1D transformation in the overlapped block processing module 350, and in reference to FIG. 3, at each zz_index, the 1D transform 308 processes the four (4) samples bs(zz_index, 0:3) to produce bhaar(0:63,0:3), which includes Haar subbands [L20, H20, H02, H11]. The first index is from the stages 0, 1, 2, so L20 and H20 are from the $3^{rd}$ stage 610 (FIG. 6D), H02 is from the first stage 606 (FIG. 6D), and H11 is from the $2^{nd}$ stage (608). These Haar subbands are as illustrated in FIG. 6D and are further interpreted with respect to the matched frames as follows:

L20: summation of all matched blocks b(i,j,0:7);
H20: difference between matched blocks in MSUM0123(t) and the total sum of matched blocks in M4(t), M5(t) and 2×MSUM67(t);
H02: For 2D+1 Accumulation Buffer (FIG. 6C), difference between matched blocks b4 and b7 from frames M4(t), and M7(t), respectively. For 2D Accumulation Buffer (FIG. 6D), difference between matched blocks b4 and b5 from frames M4(t), and M5(t), respectively.
H11: For 2D+1 Accumulation Buffer (FIG. 6C), difference between sum (b4+b7) matched blocks from M4(t) and M7(t) respectively, and 2×MSUM56(t). For 2D Accumulation Buffer (FIG. 6D), difference between sum (b4+b5) matched blocks from M4(t) and M5(t) respectively, and 2×MSUM56 (t).

Figure 7:
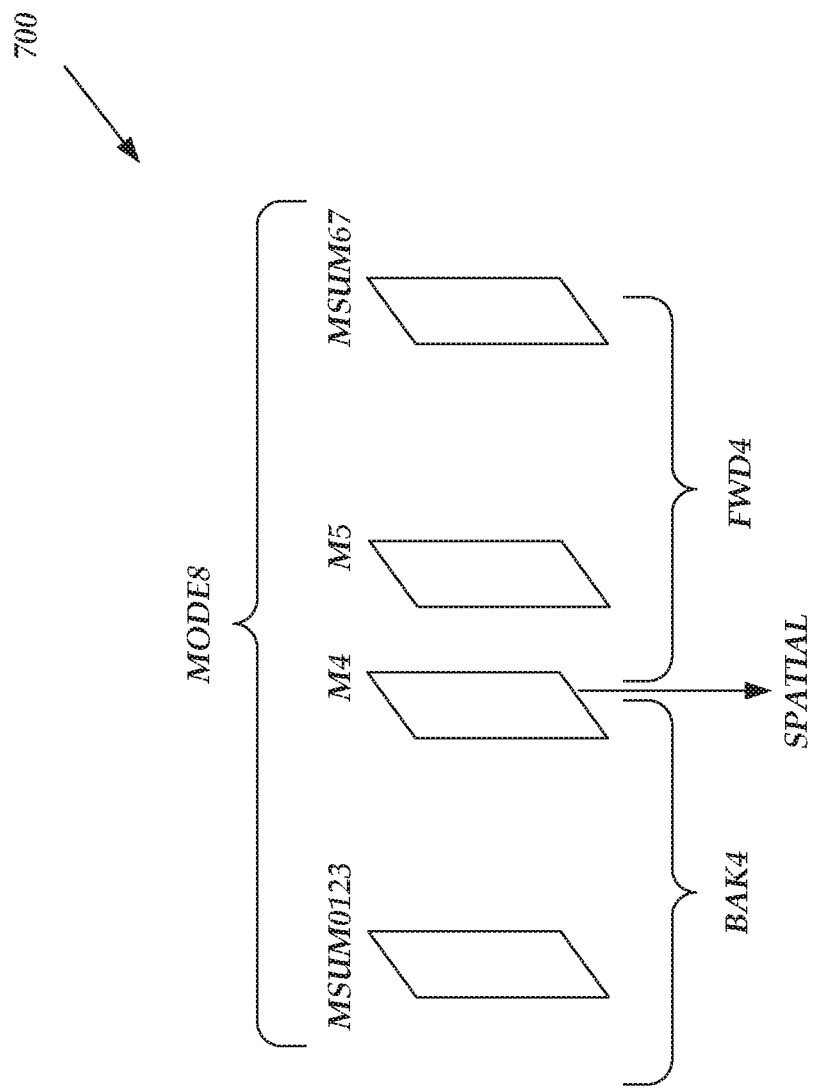
FIG. 7 is a schematic diagram that conceptually illustrates the use of temporal modes in an overlapped block processing module.

With reference to FIG. 7, shown is a schematic diagram 700 that conceptually illustrates the various temporal mode selections that determine whether 3D or 2D thresholding is enabled, and whether Haar or spatial subbands are thresholded for 3D and 2D, respectively. As shown, the selections include MODE8, BAK4, FWD4, and SPATIAL, explained further below. The temporal mode selections make it possible for the VDN systems 200 to adapt to video scenes that are not temporally correlated, such as scene changes, or other discontinuities (e.g., a viewer blinks his or her eye or turns around during a scene that results in the perception of a discontinuity, or discontinuities associated with a pan shot, etc.) by enabling a determination of which frames of a given temporal sequence (e.g., F0(t)-F7(t)) can be removed from further transform and/or threshold processing. The TemporalMode selections are as follows:

For TemporalMode==MODE8 or TemporalMode==SPATIAL: (no change). In other words, for TemporalMode set to MODE8 or SPATIAL, there is no need to preprocess the samples before the 1D transform. For FWD4 or BAK4 temporal modes, the samples undergo preprocessing as specified below.
For TemporalMode==FWD4: (Input sample b0+b1+b2+b3 from MSUM0123(t) is set equal to zero);
For TemporalMode==BAK4: (Input sample b4 set equal to 4*b4);

In one embodiment, a temporal mode module 302 computes TemporalMode after the 2D transform is taken on the 8×8×4 set of blocks. The TemporalMode takes on one of the following four values:
(a) SPATIAL: when the TemporalMode is set to SPATIAL, 2D (spatial) thresholding takes place after the 2D transform on each 2D block bs(0:63, t) 0≤t≤3 separately to produce bst(0:3, t). In other words, under a spatial temporal mode, there is no 1D transformation or thresholding of 3D blocks (temporal dimension is removed for this iteration). If the Temporal Mode is not set to SPATIAL, then bst(0:63, t) is set to bs(0:63, t) (pass-through).
(b) FWD4: when the TemporalMode is set to FWD4, right-sided (later) samples from M4(t), M5(t) and MSUM67 (t) are effectively used, and samples from the left (earlier) side, in MSUM0123(t), are not used.
(c) BAK4: when the TemporalMode is set to BAK4, left-sided (earlier) samples from MSUM0123(t) and M4(t) are effectively used, and samples from the right (later) side, in M5(t) and MSUM67(t), are not used.
(d) MODE8: when the TemporalMode is set to MODE8, all samples are used.

The TemporalMode is computed for every overlapped set of blocks (e.g., its value is computed at every overlapped block position). Therefore, implicitly, TemporalMode is a function of i,j, so TemporalMode(i,j) denotes the value of TemporalMode for the i,j-th pixel position in the overlapped block processing. The shorthand, "TemporalMode" is used throughout herein with the understanding that TemporalMode comprises a value that is computed at every overlapped block position of a given frame to ensure, among other reasons, proper block matching was achieved. In effect, the selected temporal mode defines the processing (e.g., thresholding) of a different number of subbands (e.g., L20, H20, etc.).

Having described the various temporal modes implemented in the VDN systems 200, attention is now directed to a determination of which temporal mode to implement. To determine TemporalMode, the SubbandSAD is computed (e.g., by the 2D transform module 304 and communicated to the temporal mode module 302) between the blocks bs(0: 63,k) and bs(0:63, 1) for 0≤k≤3 (zero for k=1), which establishes the closeness of the match of co-located blocks of the inputted samples (from the matched frames), using the low-frequency structure of the blocks where the signal can mostly be expected to exceed noise. Explaining further, the determination of closeness of a given match may be obscured or skewed when the comparison involves noisy blocks. By rejecting noise, the level of fidelity of the comparison may be improved. In one embodiment, the VDN system 200*c*-1 effectively performs a power compaction (e.g., a forward transform, such as via DCT) of the blocks at issue, whereby most of the energy of a natural video scene are power compacted into a few, more significant coefficients (whereas noise is generally uniformly distributed in a scene). Then, a SAD is performed in the DCT domain between the significant few coefficients of the blocks under comparison (e.g., in a subband of the DCT, based on a predefined threshold subband SAD value, not of the entire 8×8 block), resulting in removal of a significant portion of the noise from the computation and hence providing a more accurate determination of matching.

Explaining further, in one embodiment, the subbandSAD is computed using the ten (10) lowest frequency elements of the 2D transformed blocks bs(0:9, 0:3) where the frequency order low-to-high follows the zig-zag scanning specified hereinbefore. In some embodiments, fewer or greater numbers of lowest frequency elements may be used. Accordingly, for this example embodiment, the SubbandSAD(k) is given by the following equation:

$$SubbandSAD(k) = \sum_{z=0}^{9} |bs(z, k) - bs(z, 1)|, \quad \text{Eq. (20)}$$

where 0≤k≤3, and SubbandSAD(1)=0.
Integer counts SubbandFWDCount4, SubbandBAKCount4 and SubbandCount8 may be defined as follows:

$$SubbandCountFWD\,4 = \quad \text{Eq. (21a)}$$
$$\sum_{k=1}^{3} SetToOneOrZero(SubbandSAD(k) < Tsubbandsad)$$

$$SubbandCountBAK\,4 = \quad \text{Eq. (21b)}$$
$$\sum_{k=0}^{1} SetToOneOrZero(SubbandSAD(k) < Tsubbandsad)$$

$$SubbandCount\,8 = \quad \text{Eq. (21c)}$$
$$\sum_{k=0}^{3} SetToOneOrZero(SubbandSAD(k) < Tsubbandsad)$$

where the function SetToOneOrZero(x) equals 1 when its argument evaluates to TRUE, and zero otherwise, and Tsubbandsad is a parameter. In effect, Eqns. 21a-21c are computed to determine how many of the blocks are under the subband SAD threshold, and hence determine the temporal mode to be implemented. For instance, referring to Eq. 21c, for MODE8, the DCT of b0+b1+b2+b3 should be close enough in the lower frequencies to the DCT of b4 (and likewise, the DCT of b5 and b6+7 should be close enough in the lower frequencies to b4). Note that k=0 to k=3 since there is b0+b1+b2+b3, b4 (though k=1 is meaningless since the subband SAD of b4 with itself is zero), b5, and b6+7.

In Eq. 21a, for FWD4, the closeness of b4 with b5 and b6+7 is evaluated, so the numbering fork goes from 1-3 (though should go from 2 to 3 since 1 is meaningless as explained above). In Eq. 21b, numbering for k goes from 0 to 1, since only the zeroth sample is checked (i.e., the b0+1+2+3 sample, and again, 1 is meaningless since b4 always matches itself).

Accordingly, using SubbandCountFWD4, SubbandCountBAK4, and SubbandCount8, TemporalMode is set as follows:
If SubbandCount8==4, then TemporalMode=MODE8;
else if SubbandCountFWD4==3 then TemporalMode=FWD4;
else if SubbandCountBAK4==2 then TemporalMode=BAK4;
else TemporalMode=SPATIAL.
Note that this scheme favors FWD4 over BAK4, but if MODE8 is not signaled, then only one of FWD4 or BAK4 can be satisfied anyway.

Thresholding is performed on the 2D or 3D transformed blocks during the overlapped block processing. For instance, when TemporalMode is set to SPATIAL, the 2D threshold module 306 is signaled, enabling the 2D threshold module 306 to perform 2D thresholding of the 2D transformed block bs(0:63, 1) from F4(t). According to this mode, no thresholding takes place on the three (3) blocks from MSUM0123(t), M5(t) or MSUM67(t) (i.e., there is no 2D thresholding on bs(0:63, 0), bs(0:63, 2), bs(0:63, 3)).

Figure 8:
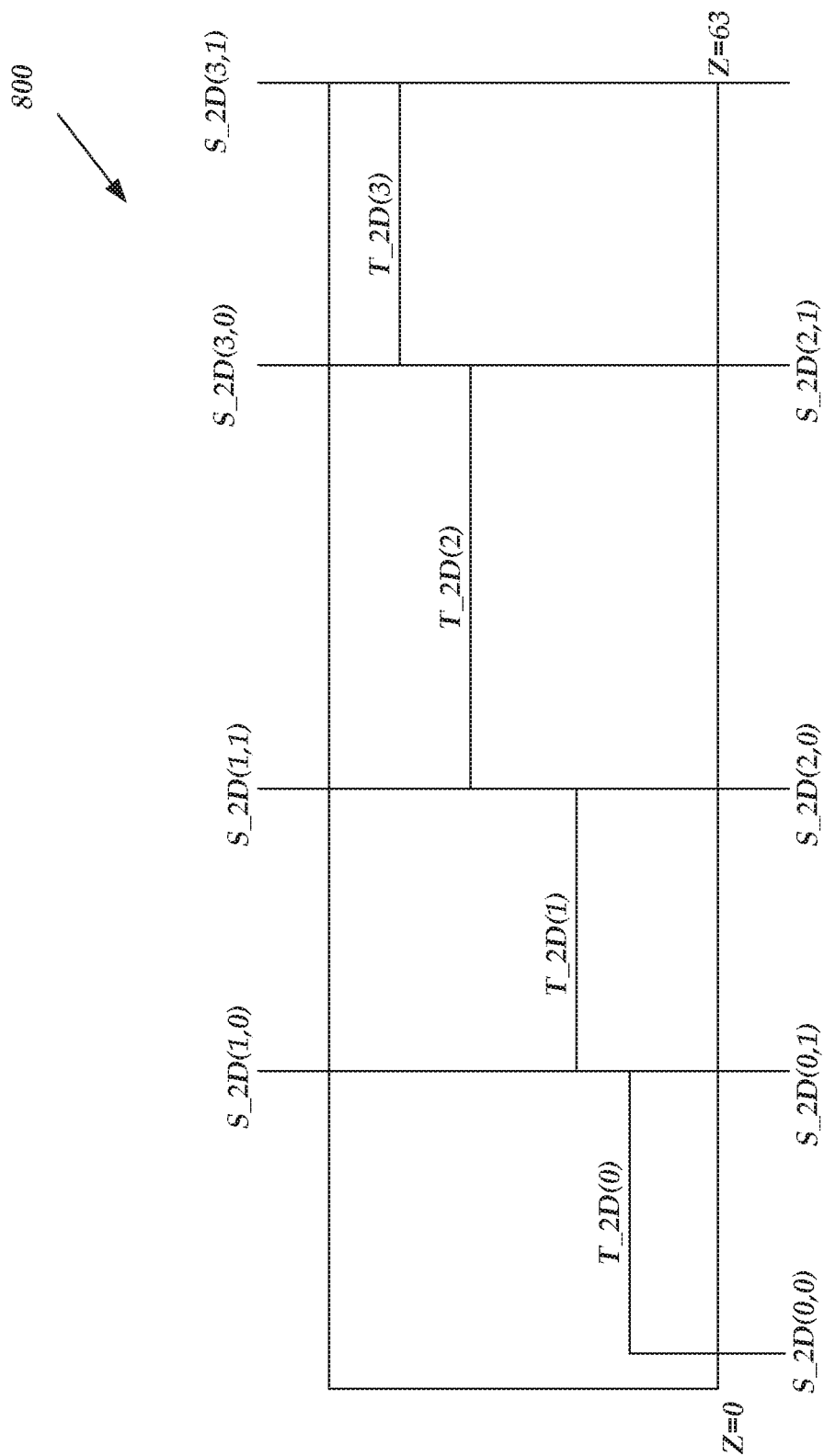
FIG. 8 is a schematic diagram that illustrates an example mechanism for thresholding.

Reference is made to FIG. 8, which is a schematic diagram 800 that illustrates one example embodiment of time-space frequency partitioning by thresholding vector, T_2D, and spatial index matrix, S_2D, each of which can be defined as follows:
T_2D(0:3): 4-element vector of thresholds
S_2D(0:3,2): 4×2 element matrix of spatial indices
Together, T_2D and S_2D define the parameters used for thresholding the 2D blocks bs(0:63, 1). For only the 8×8 2D transformed block bs(0:63, 1), the thresholded block bst(0:63, 1) may be derived according to Eq. (22) below:

$$bst(z, t) = \begin{cases} 0 & \text{if } |bs(z, 1)| < T\_2D(j) \text{ and} \\ & S\_2D(j, 0) \le z \le S\_2D(j, 1) \\ bs(z, 1) & \text{otherwise} \end{cases} \quad \text{(Eq. 22)}$$

for j = 0 ... 3.

In Eq. (22), T_2D(j) defines the threshold used for block 1, bs(0:63,1) from M4(t), over a span of spatial indices S_2D (j,0) to S_2D(j,1) for j=0 . . . 3. Equivalently stated, elements of bs(S_2D(j,0): S_2D(j,1),1) are thresholded by comparing the values of those elements to the threshold T_2D(j), and the values in bs(S_2D(j,0): S_2D(j,1),1) are set to zero when their absolute values are less than T_2D(j). Note that none of the matched frames MSUM0123(t), MSUM67(t) or M5(t) undergo 2D thresholding, only blocks from M4(t), bs(0:63, 1).

The spatial index matrix S_2D together with T_2D define a subset of coefficients in the zig-zag scanned spatial frequencies as illustrated in FIG. 8. The 2D space has been reduced to 1D by zig zag scanning.

Thresholding (at 3D threshold module 310) of the 3D transformed blocks bhaar(0:63,0:3) output from 1D transform module 308 is performed when TemporalMode is set to either FWD4, BAK4 or MODE8. Otherwise, when TemporalMode is set to SPATIAL, the output of 3D thresholding module 310 (e.g., bhaart(0:63,0:3)) is set to the input of the 3D thresholding module 310 (e.g., input equals bhaar(0:63, 0:3)) without modification. The 3D thresholding module 310 uses threshold vectors T_3D(j) and spatial index matrix S_3D(j,0:1) defined hereinabove in 2D thresholding 306, except using eight (8) thresholds so 0≤j<8.

An additional threshold vector TSUB(j,0:1) is needed for 3D thresholding 310, which defines the range of temporal subbands for each j. For example, TSUB(0,0)=0 with TSUB (0,1)=1 along with T_3D(0)=100 and S_3D(0,0)=0 and S_3D(0,1)=32 indicates that for j=0, 3D thresholding with the threshold of 100 is used across Haar subbands L20 and H20 and spatial frequencies 0 to 32.

Thresholding 310 of the 3D blocks is followed identically to the 2D thresholding 306 case following Eq. (22), but substituting T_3D and S_3D for T_2D and S_2D. For 3D thresholding 310, unlike 2D, all four (4) blocks bhaar(0:63, 0:3) are thresholded.

For MODE8, all Haar subbands are thresholded. For FWD4 and BAK4, only a subset of the Haar subbands is thresholded. The following specifies which subbands are thresholded according to TemporalMode:

If TemporalMode==MODE8 threshold [L20, H20, H02, H11] Haar Subbands
If TemporalMode==FWD4 threshold [H20, H02, H11] Haar Subbands
If TemporalMode==BAK4 threshold [L20, H20] Haar Subbands Having described example embodiments of thresholding in VDN systems, attention is again directed to FIG. 3 and inverse transform and output processing. Specifically, inverse transforms include the inverse 1D transform 312 (e.g., Haar) followed by the inverse 2D transform (e.g., AVC integer DCT), both described hereinabove. Other types of transforms may be used for both dimension, or a mix of different types of transforms different than the Haar/AVC integer combination described herein in some embodiments. For a 1D Haar transform, the inverse transform proceeds as shown in FIG. 6D and explained above.

The final denoised frame of FD4(t) using the merged accumulation buffers is specified in Eq. (23) as follows:

$$FD4(i,j)=A(i,j)/W(i,j) \qquad \text{Eq. (23)}$$

For uniform weighting where w(i,j)=1 for all overlapped blocks, Eq. (23) amounts to a simple divide by 16 (for step size=2). However, if selectively omitting blocks, then Eq. (23) amounts to division by a number $1 \leq W(i,j) \leq 16$. After the 2D inverse transform 314 follows the 1D inverse transform 312, the block bd(i,j,1) represents the denoised block of F4(t). This denoised block is accumulated (added into) in the A4(t) accumulation buffer(s) 360 (e.g., accumulates the denoised estimates via repeated loops back to the 2D transform module 304 to index or shift in pixels to repeat the processing 350 for a given reference frame), and then output via normalization block 370.

Figure 9:
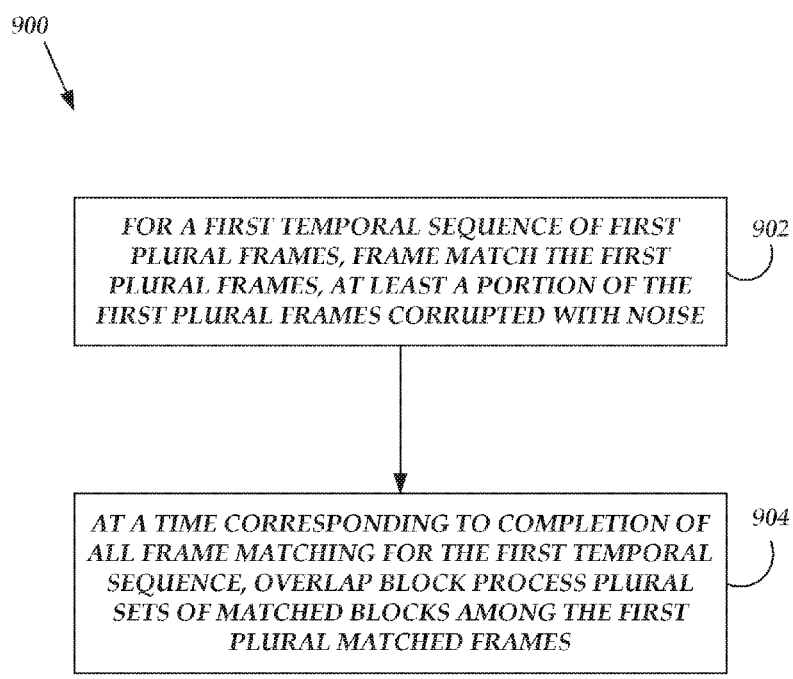
FIG. 9 is a flow diagram that illustrates an example method embodiment for decoupled frame matching and overlapped block processing.

Having described various embodiments of VDN systems 200, it should be appreciated that one method embodiment 900, implemented in one embodiment by the logic of the VDN system 200c-1 (FIG. 3) and shown in FIG. 9, comprises for a first temporal sequence of first plural frames, frame matching the first plural frames, at least a portion of the first plural frames corrupted with noise (902), at a time corresponding to completion of all frame matching for the first temporal sequence, overlap block processing plural sets of matched blocks among the first plural matched frames (904).

Figure 10A:
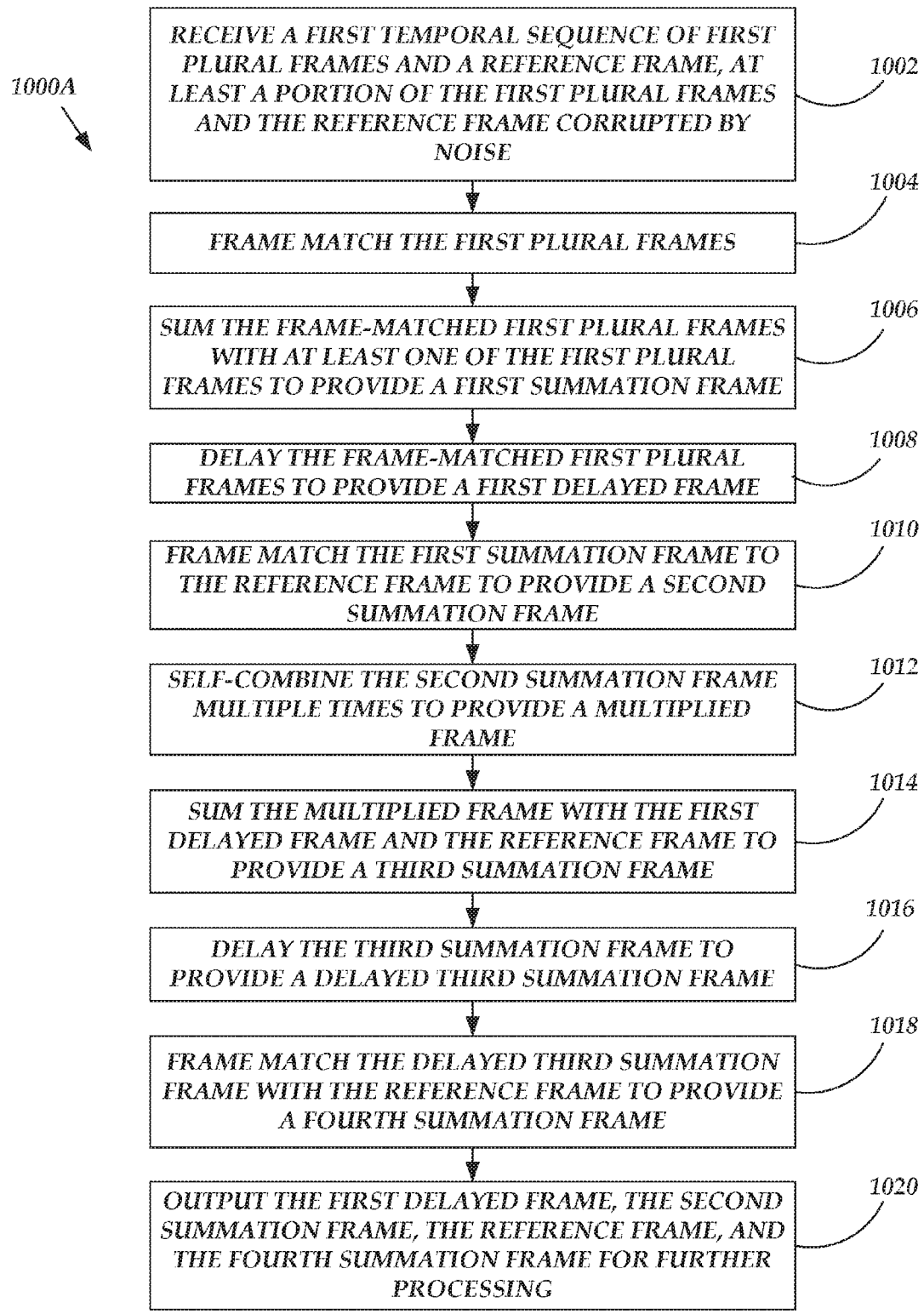
FIGS. 10A-10B are flow diagrams that illustrate example method embodiments for frame matching.

Another method embodiment 1000a, shown in FIG. 10A and implemented in one embodiment by frame alignment module 310a (FIG. 4A), comprises receiving a first temporal sequence of first plural frames and a reference frame, at least a portion of the first plural frames and the reference frame corrupted by noise (1002), frame matching the first plural frames (1004), summing the frame-matched first plural frames with at least one of the first plural frames to provide a first summation frame (1006), delaying the frame-matched first plural frames to provide a first delayed frame (1008), frame matching the first summation frame to the reference frame to provide a second summation frame (1010), self-combining the second summation frame multiple times to provide a multiplied frame (1012), summing the multiplied frame with the first delayed frame and the reference frame to provide a third summation frame (1014), delaying the third summation frame to provide a delayed third summation frame (1016), frame matching the delayed third summation frame with the reference frame to provide a fourth summation frame (1018), and outputting the first delayed frame, the second summation frame, the reference frame, and the fourth summation frame for further processing (1020).

Figure 10B:
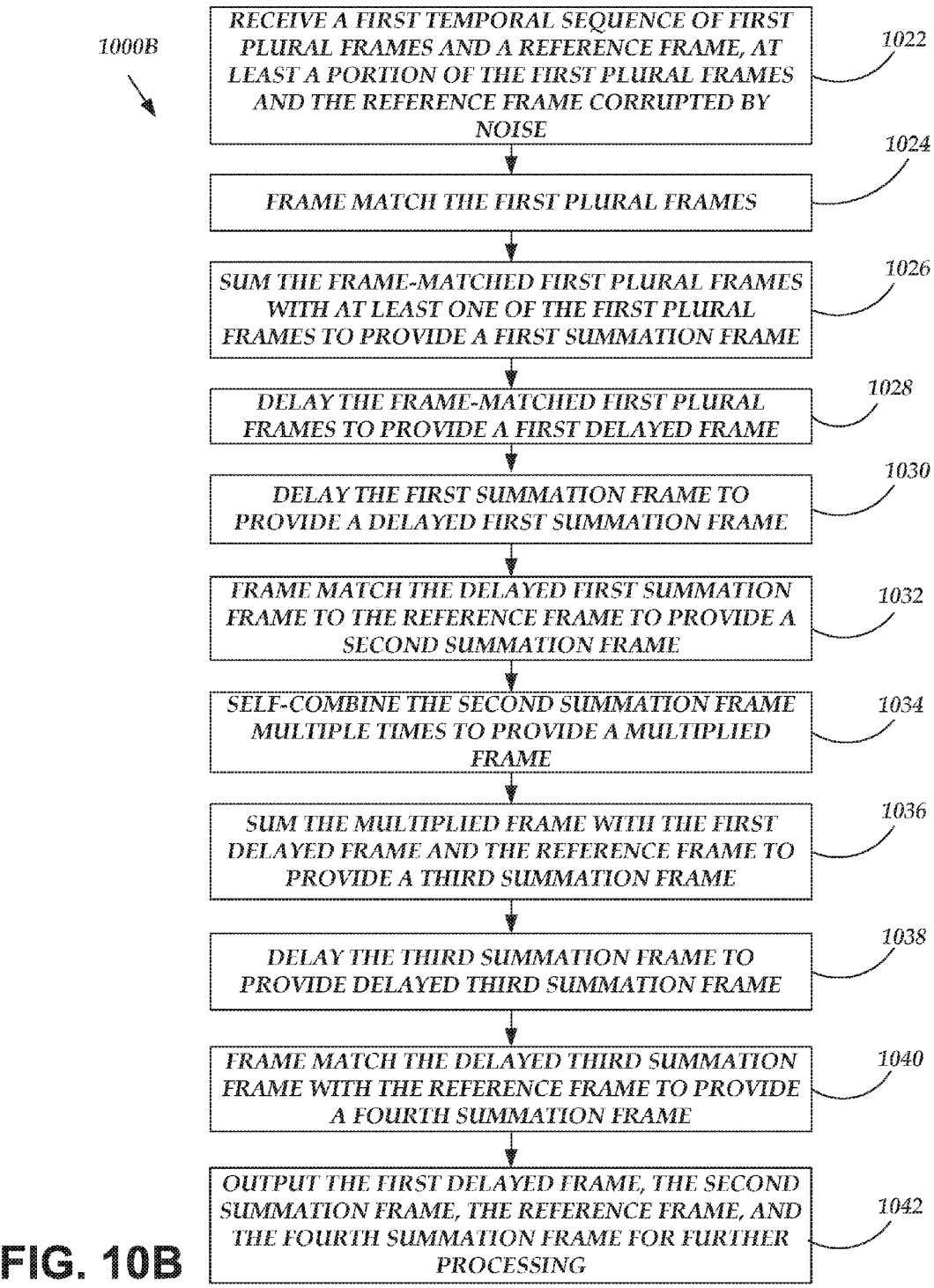

Another method embodiment 1000b, shown in FIG. 10B and implemented in one embodiment by frame alignment module 310b (FIG. 4B), comprises receiving a first temporal sequence of first plural frames and a reference frame, at least a portion of the first plural frames and the reference frame corrupted by noise (1022); frame matching the first plural frames (1024); summing the frame-matched first plural frames with at least one of the first plural frames to provide a first summation frame (1026); delaying the frame-matched first plural frames to provide a first delayed frame (1028); delaying the first summation frame to provide a delayed first summation frame (1030); frame matching the delayed first summation frame to the reference frame to provide a second summation frame (1032); self-combining the second summation frame multiple times to provide a multiplied frame (1034); summing the multiplied frame with the first delayed frame and the reference frame to provide a third summation frame (1036); delaying the third summation frame to provide delayed third summation frame (1038); frame matching the delayed third summation frame with the reference frame to provide a fourth summation frame (1040); and outputting the first delayed frame, the second summation frame, the reference frame, and the fourth summation frame for further processing (1042).

Figure 11:
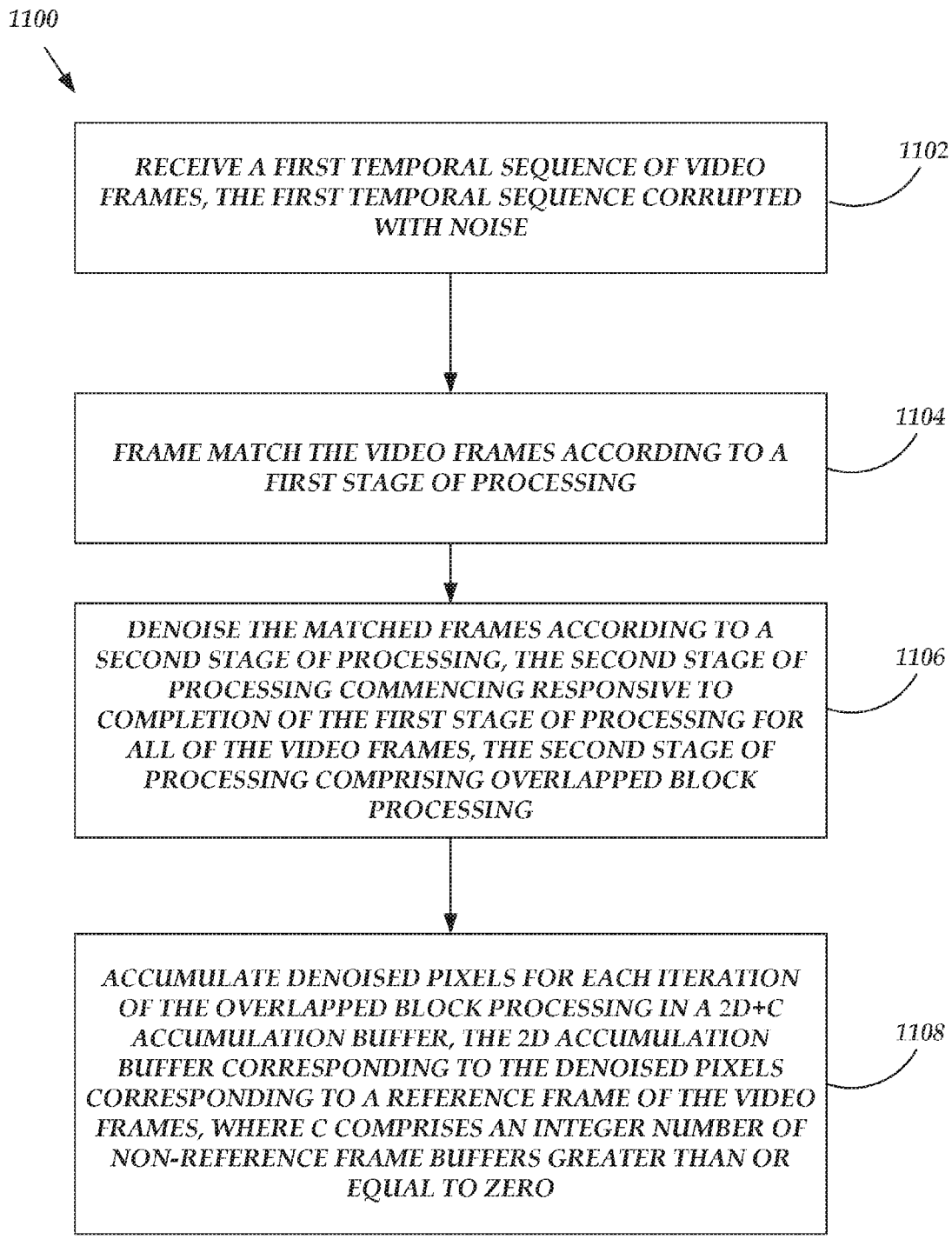
FIG. 11 is a flow diagram that illustrates an example method embodiment for frame matching and video denoising that includes various embodiments of accumulation buffer usage.

Another method embodiment 1100, shown in FIG. 11 and implemented in one embodiment by VDN system 200 corresponding to FIGS. 2A-2C and FIG. 3, comprises receiving a first temporal sequence of video frames, the first temporal sequence corrupted with noise (1102); frame matching the video frames according to a first stage of processing (1104); denoising the matched frames according to a second stage of processing, the second stage of processing commencing responsive to completion of the first stage of processing for all of the video frames, the second stage of processing comprising overlapped block processing (1106); and wherein denoising further comprises accumulating denoised pixels for each iteration of the overlapped block processing in a 2D+c accumulation buffer, the 2D accumulation buffer corresponding to the denoised pixels corresponding to a reference frame of the video frames, where c comprises an integer number of non-reference frame buffers greater than or equal to zero (1108).

Figure 12A:
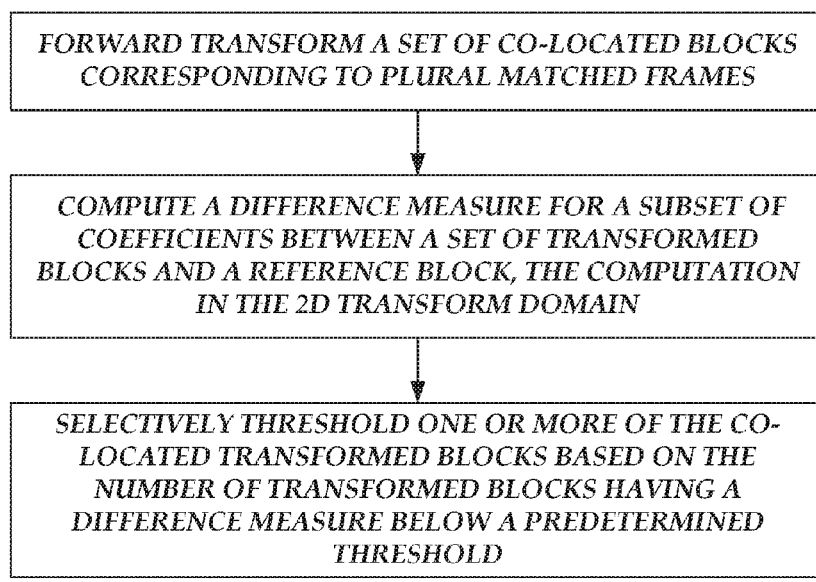
FIGS. 12A-12B are flow diagrams that illustrate example method embodiments for determining noise thresholding mechanisms.

Another method embodiment 1200a, shown in FIG. 12A and implemented in one embodiment by the overlapped block processing module 350 (FIG. 3), comprises forward transforming a set of co-located blocks corresponding to plural matched frames (1202); computing a difference measure for a subset of coefficients between a set of transformed blocks and a reference block, the computation in the 2D transform domain (1204); and selectively thresholding one or more of the co-located transformed blocks based on the number of transformed blocks having a difference measure below a predetermined threshold (1206).

Figure 12B:
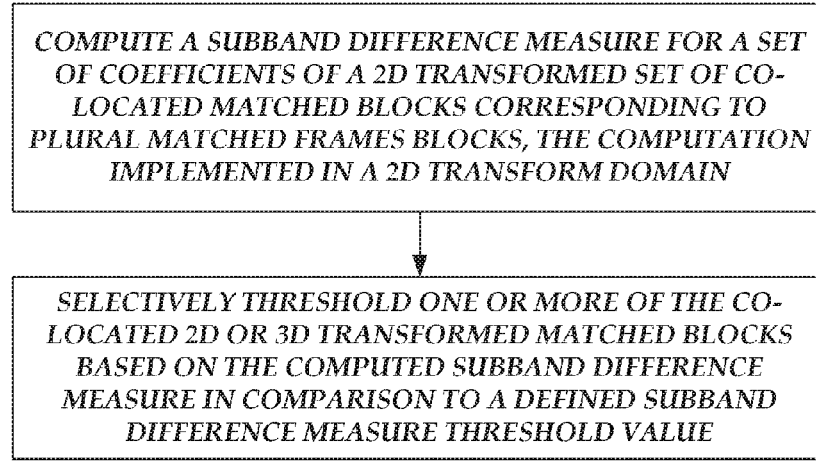

Another method embodiment 1200b, shown in FIG. 12B and implemented in one embodiment by the overlapped block processing module 350 (FIG. 3), comprises computing a subband difference measure for a set of coefficients of a 2D transformed set of co-located matched blocks corresponding to plural matched frames blocks, the computation implemented in a 2D transform domain (1208); and selectively thresholding one or more of the co-located 2D or 3D transformed matched blocks based on the computed subband difference measure in comparison to a defined subband difference measure threshold value (1210).

Figure 13:
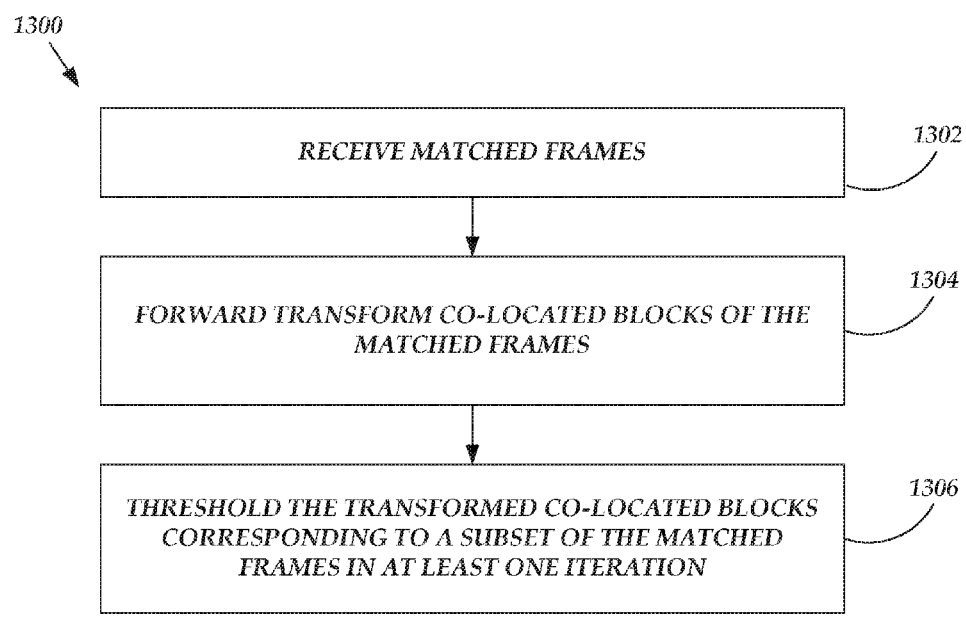
FIG. 13 is a flow diagram that illustrates an example method embodiment for adaptive thresholding in video denoising.

Another method embodiment 1300, shown in FIG. 13 and implemented in one embodiment by the overlapped block processing module 350 (FIG. 3), comprises receiving matched frames (1302); forward transforming co-located blocks of the matched frames (1304); and thresholding the transformed co-located blocks corresponding to a subset of the matched frames in at least one iteration (1306).

Figure 14:
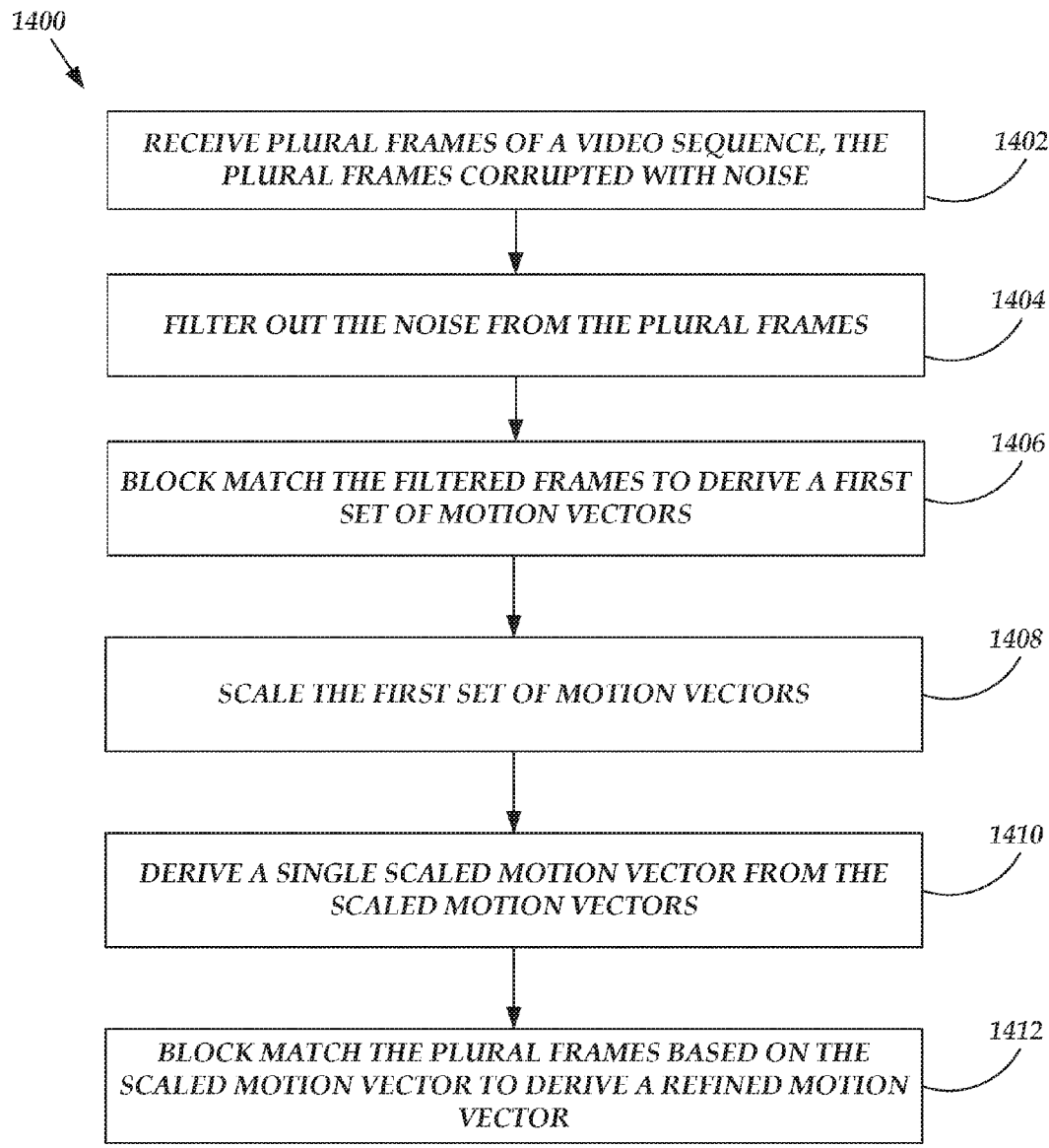
FIG. 14 is a flow diagram that illustrates an example method embodiment for filtered and unfiltered-based motion estimation.

Another method embodiment 1400, shown in FIG. 14 and implemented in one embodiment by the frame matching module 402 (FIG. 5) comprises receiving plural frames of a video sequence, the plural frames corrupted with noise (1402); filtering out the noise from the plural frames (1404); block matching the filtered frames to derive a first set of motion vectors (1406); scaling the first set of motion vectors (1408); deriving a single scaled motion vector from the scaled motion vectors (1410); and block matching the plural frames based on the scaled motion vector to derive a refined motion vector (1410).

As described above, noise filtering may use overlapped and thresholded 2D and 3D transforms in overlapped block processing. Since the transforms are overlapped, the computational complexity in the transform process may be increased compared to video compression, where transforms may occur instead on partitioned blocks of the video frames. A need exists to enable implementations for reduced computation environments, such as a software-only implementation for example.

One way of reducing computational complexity in overlapped block processing may be to reduce the amount of overlap of the transforms. The amount of overlap may be controlled by the step size s described above. The greater the step size s, the less overlap. When s=1, the transform process moves across the video frame pixel by pixel, horizontally and vertically, so the overlap of the transform blocks is greatest, and therefore computational complexity is greatest. As an example, for an 8×8 2D DCT transform, each pixel is transformed by 64 unique DCTs when s=1 (except for border pixels). However, when the step size is increased, for example, to s=4, the transforming moves 4 pixels at a time horizontally and vertically over the video frame, so each pixel is transformed by 4 DCTs (except for border pixels), and computational complexity is reduced to approximately 6.3% (4/64) compared to step size s=1.

Reduced overlap in overlapped block processing via larger step sizes, however, may affect the denoising performance of the filter, and may also inject undesired blocking artifacts into the filtered video. 2D examples instead of 3D are described herein with the understanding that the process described applies to 2D or 3D overlapped transform processing (i.e., overlapped block processing). In 3D, the transforms may be of size $N_b \times N_b \times t$, where t is the time dimension, which may be the number of successive video frames employed in the 3D transform. In 2D, the transforms may be of size $N_b \times N_b$ pixels, with an example value $N_b$=8. The same blocking issue described may exist whether the filtering process is 2D or 3D. For images, there may be no time dimension and the process is 2D.

Since one of the goals of the filtering described above is to remove digital artifacts in addition to noise, it may be a disadvantage if the filtering process itself introduces artifacts while aimed instead at removing them. In other words, without some corrective process, use of a larger step size s in the transform overlapping may be a disadvantage because one drawback of increasing the step size s of the overlapped transforming is that blocking artifacts may creep into the filtered result. Embodiments of the disclosure, however, may counteract the blocking artifacts associated with a larger step size s in the overlapped transform processing (i.e., overlapped block processing) by using, for example: i) pseudorandom stepping of the transforms; and ii) weighted pixel accumulation using, for example, matrix M.

Figure 15A:
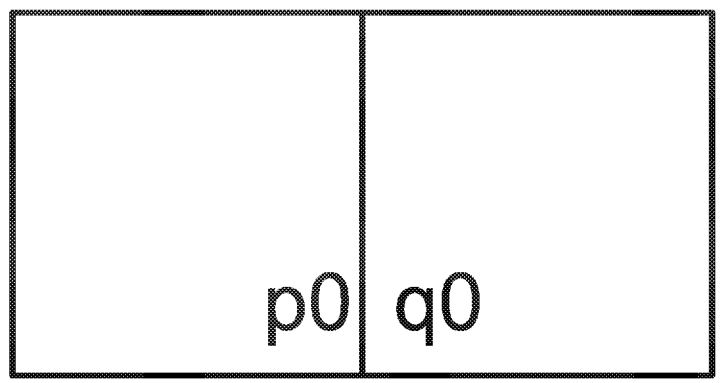
FIGS. 15A and 15B show adjoined pixels.

To explore the reasons the increased step size s of overlapped transforming in overlapped block processing leads to blocking artifacts, consider the pixels p0 and q0 in FIG. 15A. Pixel p0 may be the bottom right pixel of an $N_b \times N_b$ block of pixels (e.g., $N_b$=8), and pixel q0 may be immediately adjacent and to the right of pixel p0, and on the bottom left of a shifted transform block as shown in FIG. 15A.

As a result of the filtering process, pixel p0 will take on more characteristics of the pixels in its block of pixels, and similarly for q0. Since p0 and q0, under this increased step size condition, may be processed with no pixels in common (i.e., their respective blocks of pixels), this process may create an artificial visual separation between p0 and q0 after the filtering process. Similarly, all pixels in a vertical line immediately above p0 and in a line on the right edge of the transformed p0 block may have a visual separation compared to the pixels in a vertical line above q0 (i.e., pixels on the left edge of the block in q0).

In the case where the step size s is half of $N_b$ (e.g., s=4 with $N_b$=8), then for one-sided pixels, 50% of the transforms may include the issue of FIG. 15A, and for 50% of the transforms, p0 and q0 may be in the middle of their transformed blocks and therefore not one-sided. This situation may create a vertical seam (i.e., blocking) that may be visually noticeable.

Figure 15B:
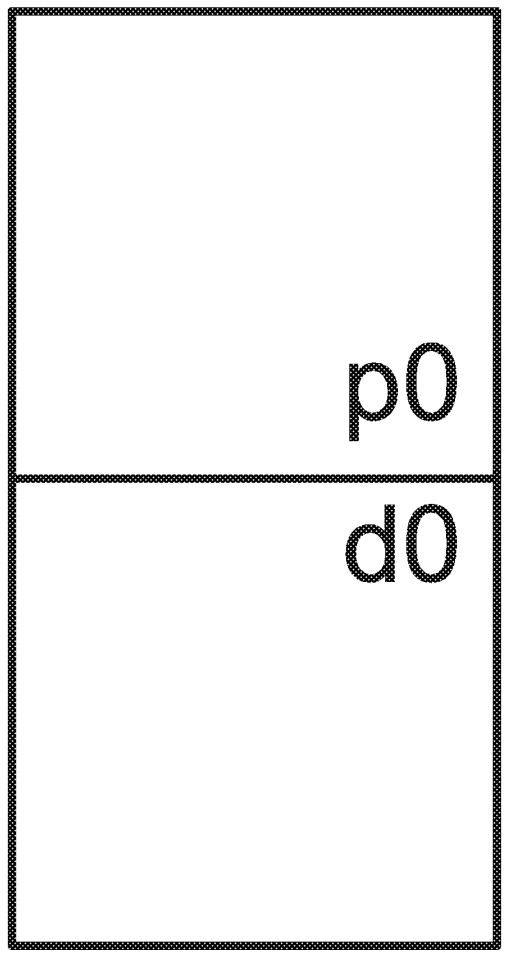

The same situation may also exist for pixels on the top and bottom of their transformed blocks as shown in FIG. 15B. For pixels p0 and d0 in FIG. 15B, filtering with increased step sizes may create horizontal seams due to artificial separation of p0 and d0 and all pixels in a horizontal line adjacent to p0 and d0 in their respective blocks.

Consequently, when using stepped transforms, there may be horizontal and vertical lines of pixels that may become disadvantaged pixels that may in turn create a blocking appearance over the frame. For example, when $N_b$=8 and s=4, these lines may be separated every 4 pixels horizontally and every 4 pixels vertically. For example, when s is half the size of $N_b$, these lines are separated by $N_b/4$ pixels in both the horizontal and vertical dimensions of the image.

To eliminate the aforementioned vertical and horizontal lines of disadvantaged pixels, embodiments of the disclosure may use pseudorandom overlapped block processing. Consistent with embodiments of the disclosure, pseudorandom overlapped block processing may be used in the place of the overlapped block processing having a constant step size as described above. An example of an outcome of pseudorandom overlapped block processing is shown in FIG. 16. For example, FIG. 16 shows a portion of video frame pixels at a top and left borders of a video frame 1600. The pixels marked with an X represent the top left corner of an $N_b \times N_b$ pixel block being transformed by pseudorandom overlapped block processing. Processing of video frame 1600 may begin at the top left border and may continue down video frame 1600 until the last $N_b$ rows of pixels and last $N_b$ columns on the bottom right have been processed.

Figure 17:
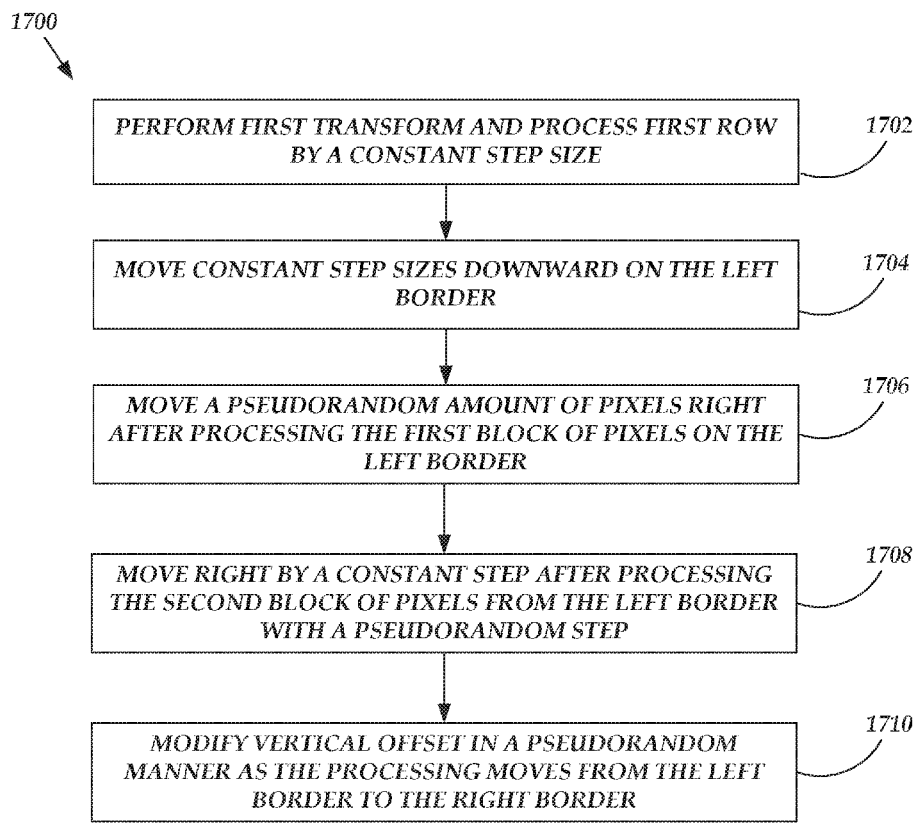
FIG. 17 is a flow diagram that illustrates an example method embodiment for providing pseudorandom overlapped block processing.

FIG. 17 is a flow chart setting forth the general stages involved in a method 1700 consistent with an embodiment of the disclosure for providing pseudorandom overlapped block processing. Pseudorandom overlapped block processing may comprise overlapped block processing where there may never be successive pixels horizontally or vertically which are one-sized in the transforms. Consistent with embodiments of the disclosure, pseudorandom overlapped block processing may eliminate lines of separation (i.e., blocking).

Consistent with embodiments of the disclosure, pseudorandom overlapped block processing may be used in the place of the overlapped block processing having a constant step size as described above. Method 1700 may be implemented using overlapped block processing module 350 as described in more detail above. Pseudorandom overlapped block processing, including method 1700, may be performed, for example, by a computing device 2100 described below with respect to FIG. 21. Ways to implement the stages of method 1700 will be described in greater detail below.

Processing of video frame 1700 may begin on the top left pixel where the first transform may be performed. The first row of $N_b$ pixels may be processed by a constant step size $N_b/2$ (1702). Each time the processing finishes row processing, it may move $N_b/2$ step pixels downward on the left border of video frame 1600. Each row may be finished by processing the right-most $N_b$ pixel columns (1704). After processing the first block of pixels on the left border, the processing may move a pseudorandom amount of pixels right (1706). The pseudorandom amount of pixels may be denoted as s1, where s1 may be constrained as follows:

$$1 \leq s1 \leq N_b/2$$

After processing the second block of pixels from the left border of video frame 1600 with a pseudorandom step s1, the processing may move right by a constant step $s=N_b/2$ (1708). As the processing moves from the left border to the right border, the vertical offset may be modified in a pseudorandom manner similarly as s1 (1710). Let $i_k$ denote the vertical coordinate of the kth step vertically. When k>1 (not the top of the frame), the vertical coordinate of the processing may be modified to:

$$i_k = i_k - s2(j)$$

where s2(j) takes on pseudorandom values constrained similarly as s1 as follows:

$$1 \leq s2 \leq N_b/2$$

Note that s2(j) is a function of j, the horizontal position, so s2 varies with each transform block as the processing moves from left to right. Consistent with embodiments of the disclosure, top, left, right and bottom borders may always be processed. There may never be successive pixels horizontally or vertically which are one-sized in the transforms. Consistent with embodiments of the disclosure, this may eliminate lines of separation (i.e., blocking). Method 1700 may be performed right to left or bottom to top.

The pseudorandom stepping of the pseudorandom overlapped block processing may eliminate lines of one-sided pixels in overlapped transforms as described above with respect to FIG. 17. Another way to mitigate the blocking artifacts associated with a larger step size s in the overlapped transform processing may be weighting the transformed results (i.e., weighted pixel accumulation). Recognizing that each filtered pixel may be the result of a weighted sum overlapped threshholded transforms, embodiments of the disclosure may modify the weighting pixel by pixel of the inverse transform block to de-emphasize the contribution of one-sided pixels at the borders of the transform blocks.

Figure 18:
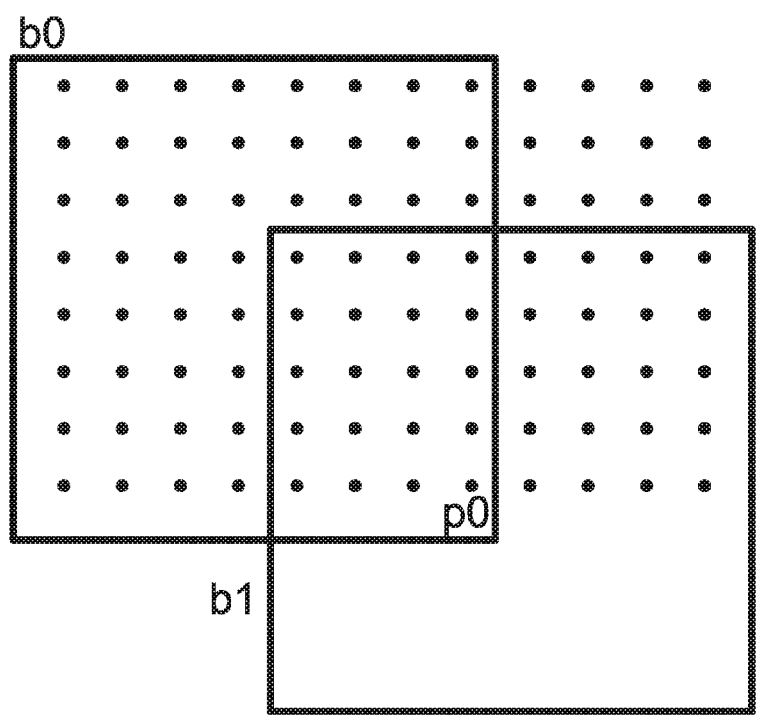
FIG. 18 shows two pixel blocks.

In FIG. 18, consider pixel p0, which may be at the bottom right of an 8×8 block of pixels, for example, denoted by b0. Block b1 may be an 8×8 block of pixels shifted compared to b0 4 pixels to the right and 3 pixels down. Note that in block b1, p0 is not one-sided because it contains pixels on both sides and above and below p0 within block b1. Therefore, the filtered estimate coming from the threshold transform of block b1 may be more desirable for pixel p0 than for block b0.

Figures 19, 20:
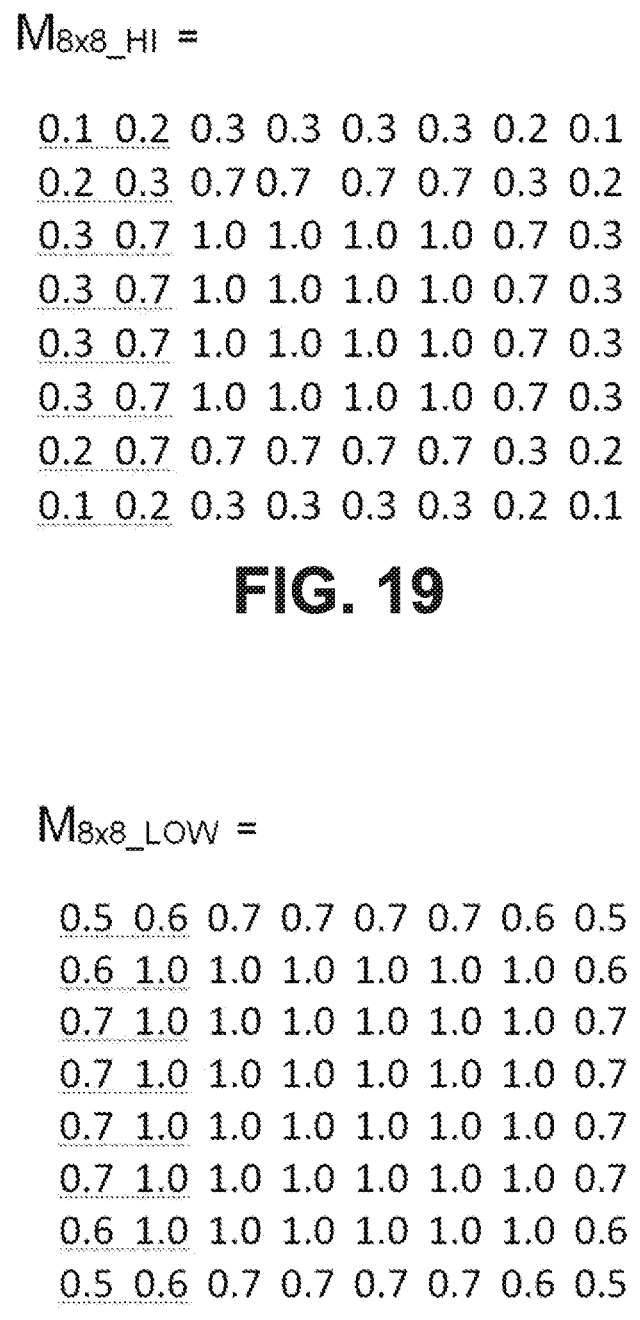

A weighting of the overlapped transform filtered output, pixel-by-pixel within each block, to emphasize more desirable estimates of pixels due to their positions within their respective blocks may be accomplished by de-weighting the estimates around the borders of the transform blocks. Consider the weighting matrix M defined, for example, for $N_b=8$ as shown in FIG. 19 as $M_{8\times8\_HI}$. Instead of employing a weighting function as defined above with respect to Eq. (23), embodiments of the disclosure may instead employ weighting function M, which unlike w(i,j) above, may be instead a weighting pixel by pixel within each block. The accumulation of pixel estimates may be modified to include weighting defined by M.

Therefore, the below A and W may be used in Eq. (23):

$$A = \Sigma \text{AccumOffset}(i,j)(\text{ElemMult}(M, bd(i,j))) \qquad \text{Eq. (24)}$$

$$W = \Sigma \text{AccumOffset}(i,j)(M) \qquad \text{Eq. (25)}$$

where the function ElemMult(a,b) denotes an element by element multiply of the members of matrices a and b. Matrix W may be deterministic as it does not depend upon the pixel blocks, so matrix W may be computed ahead of time. Consistent with embodiments of the disclosure, Eq. (24) and Eq. (25) may accomplish the de-emphasis of estimates for pixels which are in one-sided positions.

The matrix M in Eq. (24) may be set as defined hereinbefore as M8×8_HI. The need for de-emphasis may be heightened with increased filtering, so this process may allow for different realizations of the matrix M for various levels of filtering. For low (i.e., light) filtering, M can be set closer to unity at the borders as is given by $M_{8\times8\_LOW}$ as shown in FIG. 20.

Figure 21:
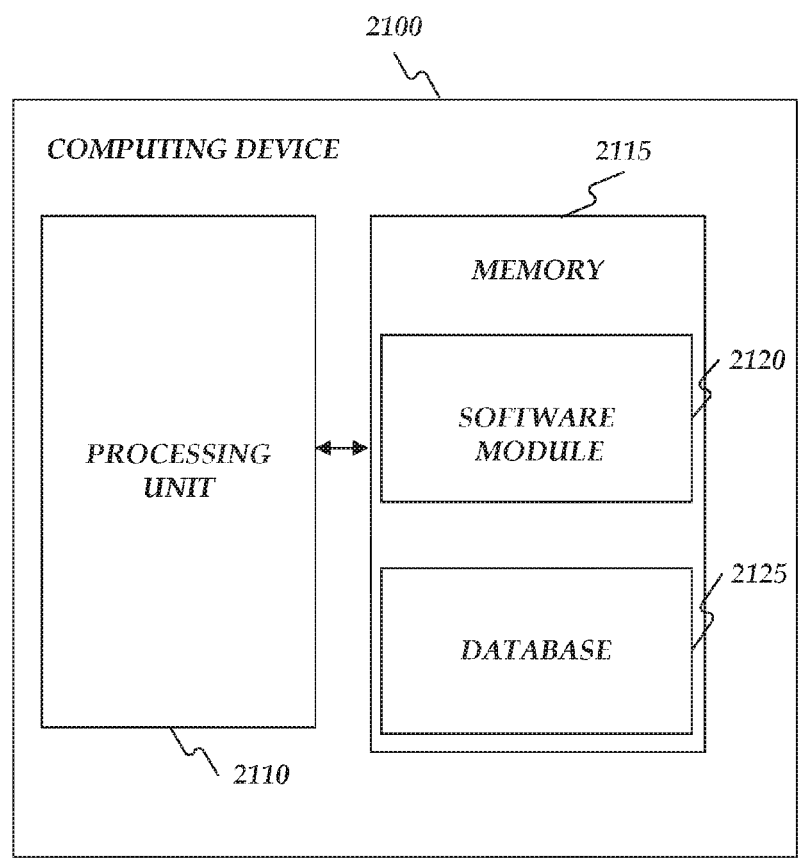
FIG. 21 is a block diagram of a system including a computing device.

FIG. 21 shows computing device 2100. As shown in FIG. 21, computing device 2100 may include a processing unit 2110 and a memory unit 2115. Memory unit 2115 may include a software module 2120 and a database 2125. While executing on processing unit 2110, software module 2120 may perform processes for providing pseudorandom overlapped block processing, including for example, any one or more of the stages from method 1700 described above with respect to FIG. 17. Computing device 2100, for example, may provide an operating environment for overlapped block processing module 350. Overlapped block processing module 350 and the plurality of access points may operate in other environments and are not limited to computing device 2100.

Computing device 2100 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 2100 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. Furthermore, computing device 400 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 2100 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 2100 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of a process identified in FIGS. 9-14 and 17 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 9-14 and 17, either in the beginning, end, and/or as intervening steps.

It should be emphasized that the above-described embodiments of the present disclosure are merely possible examples of implementations, merely set forth for a clear understanding of the principles of the VDN systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

I claim:

1. A method, comprising:
receiving a first temporal sequence of video frames, the first temporal sequence corrupted with noise;
producing matched frames by frame matching video frames of the first temporal sequence according to a first stage of processing;
denoising the matched frames according to a second stage of processing, the second stage of processing commencing responsive to completion of the first stage of processing for all the video frames of the first temporal sequence, the second stage of processing comprising overlapped block processing wherein the overlapped block processing comprises pseudorandom overlapped block processing having no successive pixels both horizontally and vertically that are one-sized in transforms, wherein denoising the matched frames further comprises accumulating denoised pixels for each iteration of the overlapped block processing in a two-dimensional (2D)+c accumulation buffer, the 2D accumulation buffer corresponding to the denoised pixels corresponding to a reference frame of the video frames, and wherein c comprises an integer number of non-reference frame buffers greater than or equal to zero;
forward transforming co-located blocks of the matched frames in at least one of the following: a spatial dimension, a temporal dimension, and a combination of the spatial and temporal dimensions;
thresholding the forward transformed co-located blocks; and
inverse transforming the thresholded blocks.

2. The method of claim 1, further comprising normalizing a denoised reference frame from the 2D accumulation buffer.

3. The method of claim 2, wherein normalizing comprises performing weighted pixel accumulation on each transform block on a pixel-by-pixel basis.

4. The method of claim 3, wherein performing weighted pixel accumulation comprises de-weighting estimates around borders of each transform block.

5. The method of claim 1, further comprising outputting a normalized frame when the value of c equals zero.

6. The method of claim 1, further comprising inverse frame matching a first frame from one of the 2D+c accumulation buffers, delaying the inverse frame matched first frame, merging the delayed first frame with a denoised reference frame from one of the 2D+c accumulation buffers, normalizing the merged frame, and outputting the normalized frame.

7. The method of claim 1, wherein the value of c is less than the quantity of video frames in the first temporal sequence.

8. The method of claim 1, wherein the value of c is one.

9. The method of claim 1, wherein producing matched frames by frame matching further comprises collapsing the video frames of the first temporal sequence, the collapsed video frames comprising pixel information approximating all of the pixels of all of the video frames, the collapsed video frames fewer in number than the quantity of the video frames in the first temporal sequence.

10. The method of claim 9, wherein collapsing comprises generating a single frame from plural frames previously frame matched in a second temporal sequence different than the first temporal sequence.

11. The method of claim 1, wherein the value of c is zero.

12. A system comprising:
a memory storage; and
a processing unit coupled to the memory storage, wherein the processing unit is operative to:
receive a first temporal sequence of video frames, the first temporal sequence corrupted with noise; producing matched frames by frame matching
produce matched frames by frame matching the video frames according to a first stage of processing; and
denoise the matched frames according to a second stage of processing, the second stage of processing commencing responsive to completion of the first stage of processing for all the video frames of the first temporal sequence, the second stage of processing comprising overlapped block processing wherein the overlapped block processing comprises pseudorandom overlapped block processing, wherein the processing unit being operative to denoise the matched frame comprises the processing unit being further operative to accumulate denoised pixels for each iteration of the overlapped block processing in a two-dimensional (2D)+c accumulation buffer, the 2D accumulation buffer corresponding to the denoised pixels corresponding to a reference frame of the video frames, wherein c comprises an integer number of non-reference frame buffers greater than or equal to zero;
forward transform co-located blocks of the matched frames in a spatial dimension, a temporal dimension, or a combination of the spatial and temporal dimensions;
threshold the forward transformed co-located blocks; and
inverse transform the thresholded blocks.

13. The system of claim 12, further comprising the processing unit being operative to normalize a denoised reference frame from the 2D accumulation buffer.

14. The system of claim 13, wherein the processing unit being operative to normalize comprises the processing unit being operative to perform weighted pixel accumulation on each transform block on a pixel-by-pixel basis.

15. The system of claim 14, wherein the processing unit being operative to perform weighted pixel accumulation comprises the processing unit being operative to de-weight estimates around borders of each transform block.

16. A non-transitory computer-readable medium that stores a set of instructions which when executed perform a method comprising:
receiving a first temporal sequence of video frames, the first temporal sequence corrupted with noise;
producing matched frames by frame matching video frames of the first temporal sequence according to a first stage of processing;

denoising the matched frames according to a second stage of processing, the second stage of processing commencing responsive to completion of the first stage of processing for all the video frames of the first temporal sequence, the second stage of processing comprising overlapped block processing, wherein the overlapped block processing comprises pseudorandom overlapped block processing having no successive pixels both horizontally and vertically that are one-sized in transforms, wherein denoising further comprises accumulating denoised pixels for each iteration of the overlapped block processing in a two-dimensional (2D)+c accumulation buffer, the 2D accumulation buffer corresponding to the denoised pixels corresponding to a reference frame of the video frames, where c comprises an integer number of non-reference frame buffers greater than or equal to zero;

forward transforming co-located blocks of the matched frames in a spatial dimension, a temporal dimension, or a combination of the spatial and temporal dimensions;

thresholding the forward transformed co-located blocks; and inverse transforming the thresholded blocks.

17. The non-transitory computer-readable medium of claim 16, further comprising outputting the normalized frame when the value of c equals zero.

18. The non-transitory computer readable medium of claim 16, further comprising normalizing a denoised reference frame from the 2D accumulation buffer, wherein normalizing comprises performing weighted pixel accumulation on each transform block on a pixel-by-pixel basis, wherein performing weighted pixel accumulation comprises de-weighting estimates around borders of each transform block.

19. The non-transitory computer readable medium of claim 16, further comprising inverse frame matching a first frame from one of the 2D+c accumulation buffers, delaying the inverse frame matched first frame, merging the delayed first frame with a denoised reference frame from one of the 2D+c accumulation buffers, normalizing the merged frame, and outputting the normalized frame.

20. The non-transitory computer readable medium of claim 16, wherein producing matched frames by frame matching further comprises collapsing the video frames of the first temporal sequence, the collapsed video frames comprising pixel information approximating all of the pixels of all of the video frames, the collapsed video frames fewer in number than the quantity of the video frames in the first temporal sequence.

* * * * *